US008625858B2

(12) United States Patent
Torii et al.

(10) Patent No.: US 8,625,858 B2
(45) Date of Patent: Jan. 7, 2014

(54) METHOD, APPARATUS, AND COMPUTER-READABLE STORAGE MEDIUM FOR PATTERN RECOGNITION

(75) Inventors: Kan Torii, Pittsburgh, PA (US); Yusuke Mitarai, Tokyo (JP); Masakazu Matsugu, Yokohama (JP); Masami Kato, Sagamihara (JP); Katsuhiko Mori, Kawasaki (JP); Hiroshi Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 868 days.

(21) Appl. No.: 12/242,470

(22) Filed: Sep. 30, 2008

(65) Prior Publication Data

US 2009/0087040 A1 Apr. 2, 2009

(30) Foreign Application Priority Data

Oct. 2, 2007 (JP) ................................ 2007-259059

(51) Int. Cl.
*G06K 9/00* (2006.01)
*G06K 9/62* (2006.01)
(52) U.S. Cl.
USPC ............ 382/118; 382/172; 382/216; 382/228
(58) Field of Classification Search
None
See application file for complete search history.

(56) References Cited

U.S. PATENT DOCUMENTS

| 6,940,545 | B1 * | 9/2005 | Ray et al. ................... 348/222.1 |
| 2005/0220336 | A1 * | 10/2005 | Sabe et al. .................. 382/159 |
| 2005/0264658 | A1 | 12/2005 | Ray et al. |
| 2006/0020597 | A1 * | 1/2006 | Keating et al. .................. 707/6 |
| 2007/0122010 | A1 * | 5/2007 | Kitamura et al. ............. 382/118 |
| 2007/0288419 | A1 * | 12/2007 | Strassner ........................ 706/55 |

FOREIGN PATENT DOCUMENTS

| JP | 11-073510 A | 3/1999 |
| JP | 2001309225 | * 2/2000 |
| JP | 2001-309225 A | 11/2001 |

OTHER PUBLICATIONS

Yusuke Mitarai, Katsuhiko Mori, and Masakazu Matsugu, Robust Face Detection System Based on Convolutional Neural Networks Using Selective Activation of Modules, Second Forum on Information Technology, FIT2003, Information Processing Society of Japan, Tokyo, Japan, Sep. 10-12, 2003.

Henry A. Rowley, Shumeet Baluja, and Takeo Kanade, Rotation Invariant Neural Network-Based Face Detection, Proceedings of the 1998 IEEE Computer Society Conference on Computer Vision and Pattern Recognition, pp. 38-44, IEEE Piscataway NJ, Jun. 23-25, 1998.

* cited by examiner

*Primary Examiner* — Bhavesh Mehta
*Assistant Examiner* — David F Dunphy
(74) *Attorney, Agent, or Firm* — Canon USA Inc IP Division

(57) ABSTRACT

A pattern recognition method, applicable to input information including a plurality of regions, includes obtaining a certainty at which each region of the input information includes a pattern, selecting one or more regions having a relatively high-level certainty among the plurality of regions, and performing pattern detection processing on the selected region or regions.

19 Claims, 16 Drawing Sheets

METHOD, APPARATUS, AND COMPUTER-READABLE STORAGE MEDIUM FOR PATTERN RECOGNITION

BACKGROUND OF THE INVENTION

1. Field of the Invention

The present invention relates to a pattern recognition method, a pattern recognition apparatus, and a computer-readable storage medium storing a program enabling a computer to execute a pattern recognition method. The pattern recognition generally includes image recognition and speech recognition.

2. Description of the Related Art

A conventional pattern recognition method directed to pattern recognition (e.g., image recognition and speech recognition) tends to decrease the processing speed if higher identification accuracy (recognition accuracy) is necessary and tends to deteriorate the identification accuracy if a higher processing speed is required.

To satisfy requirements in processing speed and identification accuracy, a conventional pattern recognition method includes connecting a first identifier improved in processing speed and a second identifier enhanced in identification accuracy (See "Robust Face Detection System Based on Convolutional Neural Networks Using Selective Activation of Modules" by Yusuke Mitarai, Katsuhiko Mori, and Masakazu Matsugu, Second Forum on Information Technology, 2003) According to such a conventional pattern recognition method, the first identifier speedily detects candidate regions and the second identifier accurately evaluates the candidate regions.

However, many of identifiers, which are usable as the above-described first or second identifier, generate a multi-valued output referred to as "certainty", as an identification result. For example, Japanese Patent Application Laid-Open No. 2001-309225 discusses a conventional method includes binarizing a multi-valued output referred to as "certainty" with a threshold and determining the presence of any pattern.

Two or more identifiers (discriminant functions) are commonly used to classify input information into a plurality of groups and identify a group (identifier) having a highest output value. For example, an identifier referred to as "Perceptron" selects a linear function that maximizes a linear sum of input information and obtains a classification corresponding to the selected linear function as an identification result. As discussed in "Rotation Invariant Neural Network-Based Face Detection" by Henry A. Rowley, Shumeet Baluja, and Takeo Kanade, Proceedings of the IEEE Conference on Computer Vision and Pattern Recognition, 1998, by calculating a linear sum using a weighting factor corresponding to an output value of each identifier, a unique classification can be obtained.

According to a conventional method using a plurality of identifiers and binarizing a certainty (output) of each identifier with a fixed threshold, selecting an appropriate threshold may be difficult because an output range of each identifier is variable depending on acquisition conditions of input information. For example, when input information is image data, if shooting conditions of an image relating to the input image data are inappropriate, each identifier may not be able to detect a face and may generate a weak output.

If a threshold used in such conditions is excessively high, the identifier cannot identify a face involved in an image as a candidate due to a weak output value. On the contrary, if the threshold is excessively low, the second identifier detects so many candidates that may decrease the processing speed. Namely, using a fixed threshold may fail to identify a face in an image in various shooting conditions.

According to a method for selecting only one candidate (which has a maximum output value) among outputs of a plurality of identifiers, the first identifier having lower identification accuracy may not be able to detect a correct candidate. If the identification accuracy of the first identifier is lower, the output of an identifier corresponding to a correct candidate may not always take a maximum value. Furthermore, the method cannot identify two or more correct candidates simultaneously, because the method leaves only one candidate.

Moreover, a complex identifier includes a plurality of identifiers. If the complex identifier employs serial and parallel arrangements to connect the identifiers, it is desired to constitute a plurality of groups each including serially connected identifiers and connect the groups in parallel to reduce a required memory capacity. However, according to such an arrangement, a rear-stage identifier constituting a serial identifier group tends to perform useless processing. The processing time tends to be longer and the identification tends to end unsuccessfully, because each serial identifier group performs processing independently. In fact, execution of a rear-stage identifier in one identifier group is dependent on the execution of a rear-stage identifier in another identifier group.

SUMMARY OF THE INVENTION

Exemplary embodiments of the present invention are directed to a pattern recognition method applicable to input information, which can easily select a threshold and can satisfy requirements in processing speed and recognition accuracy.

According to an aspect of the present invention, a pattern recognition method applicable to input information including a plurality of regions includes obtaining a certainty at which each region of the input information includes a pattern, selecting one or more regions having a relatively high-level certainty among the plurality of regions, and performing pattern detection processing on the selected region or regions.

According to another aspect of the present invention, a pattern recognition method applicable to input information includes obtaining a certainty at which the input information includes a respective one of patterns of first to n-th (n being a natural number equal to or greater than 2) classifications, selecting one or more classifications having a relatively high-level certainty among the obtained certainties, and performing pattern detection processing on the input information based on the selected classification or classifications.

According to still another aspect of the present invention, a pattern recognition method applicable to input information including a plurality of regions includes obtaining a certainty at which each region of the input information includes a respective one of patterns of first to n-th (n being a natural number equal to or greater than 2) classifications, selecting one or more combinations of a region and a classification having a relatively high-level certainty among the obtained certainties, and performing pattern detection processing on the input information according to the selected combination or combinations.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

DETAILED DESCRIPTION OF THE EMBODIMENTS

Figure 1:
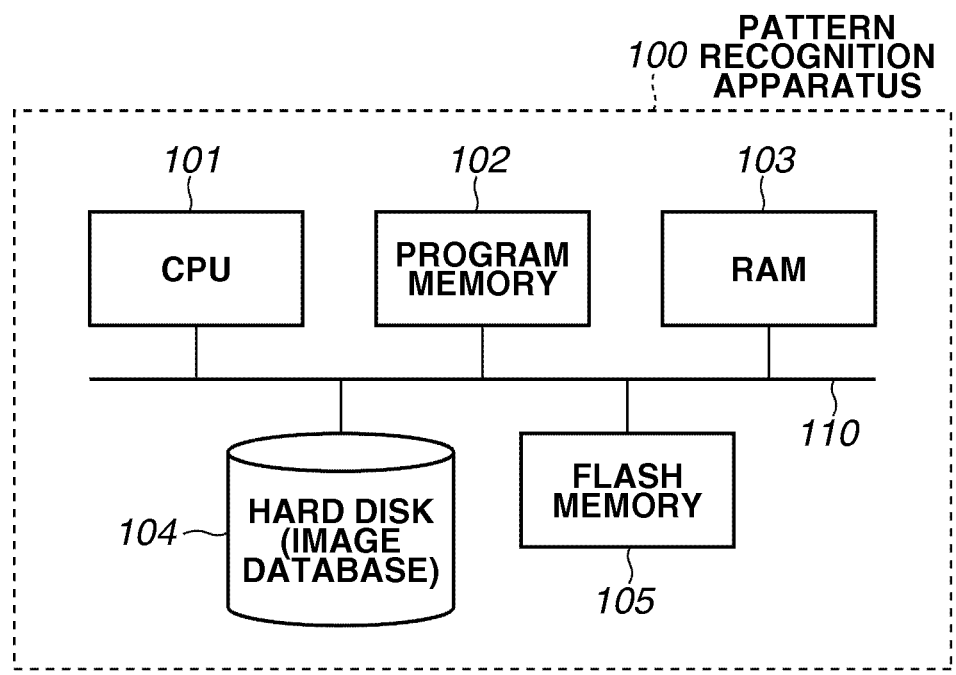
FIG. 1 is a block diagram illustrating an example hardware configuration of a pattern recognition apparatus according to a first exemplary embodiment of the present invention.

The following description of exemplary embodiments is illustrative in nature and is in no way intended to limit the invention, its application, or uses. Processes, techniques, apparatus, and systems as known by one of ordinary skill in the art are intended to be part of the enabling description where appropriate. It is noted that throughout the specification, similar reference numerals and letters refer to similar items in the following figures, and thus once an item is described in one figure, it may not be discussed for following figures. Exemplary embodiments will be described in detail below with reference to the drawings.

First Exemplary Embodiment

FIG. 1 is a block diagram illustrating an example hardware configuration of a pattern recognition apparatus 100 according to a first exemplary embodiment of the present invention. The pattern recognition apparatus 100 according to the first exemplary embodiment is, for example, an information processing apparatus. In an exemplary embodiment, input information including a plurality of regions is image data and a pattern recognized from the image data is a face.

As illustrated in FIG. 1, the pattern recognition apparatus 100 according to the first exemplary embodiment includes a central processing unit (CPU) 101, a program memory 102, a random access memory (RAM) 103, a hard disk (image database) 104, a flash memory 105, and a control bus/data bus 110. The CPU 101 integrally controls various operations performed by the pattern recognition apparatus 100. For example, the CPU 101 executes a program to realize an image processing method according to an exemplary embodiment.

The CPU 101 can execute program(s) stored in the program memory 102. The RAM 103 temporarily stores various information and various data while the CPU 101 executes the program(s).

The hard disk 104 stores various data including image data (image files), which is input from an external apparatus. The CPU 101 can read or write various information and various data from or to the flash memory 105. The flash memory 105 is attachable to or detachable from the pattern recognition apparatus 100, so that a user can carry various information and various data stored in the flash memory 105.

The control bus/data bus 110 connects the CPU 101 to the above-described devices 102 to 105. The pattern recognition apparatus 100 further includes an input device (e.g., a keyboard or a pointing device) and a display device.

Figure 2:
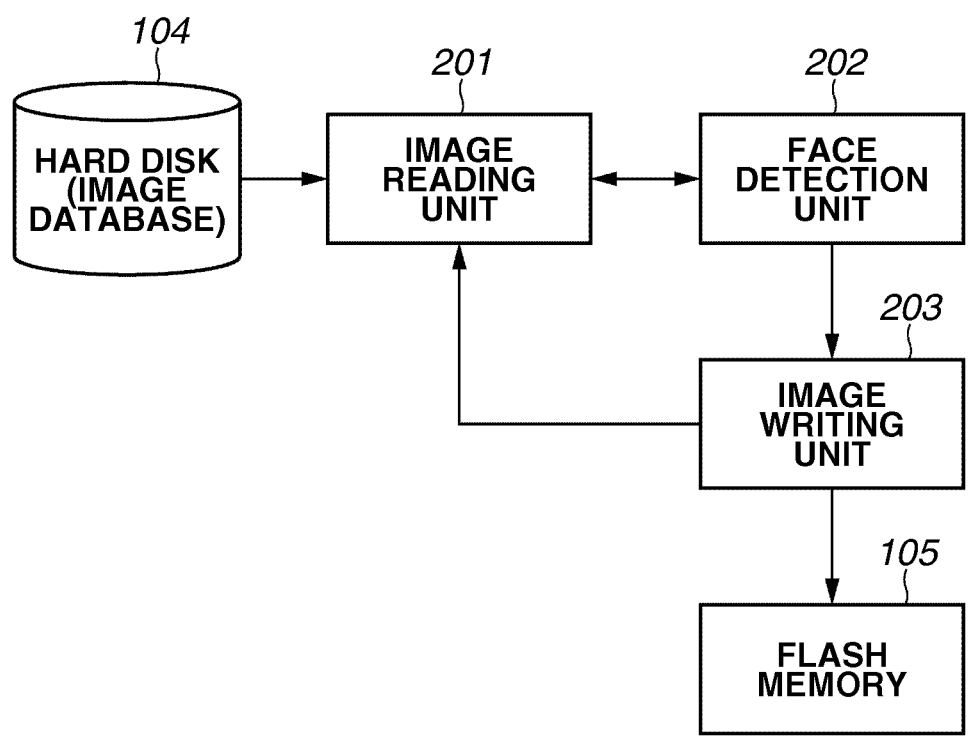
FIG. 2 is a block diagram illustrating an example functional configuration of the pattern recognition apparatus according to the first exemplary embodiment of the present invention.

FIG. 2 is a block diagram illustrating an example functional configuration of the pattern recognition apparatus 100 according to the first exemplary embodiment of the present invention. The CPU 101 executes a program stored in the program memory 102 to realize functional units 201 to 203 illustrated in FIG. 2.

A hard disk 104 illustrated in FIG. 2, which is similar to the hard disk 104 illustrated in FIG. 1, stores image data (image files). The image reading unit 201 reads out image data from the hard disk 104 and stores the read data in the RAM 103.

The face detection unit 202 determines whether the image data written in the RAM 103 includes face data. The image writing unit 203 writes, into the flash memory 105, the image data loaded in the RAM 103. A flash memory 105 is similar to the flash memory illustrated in FIG. 1.

Figure 3:
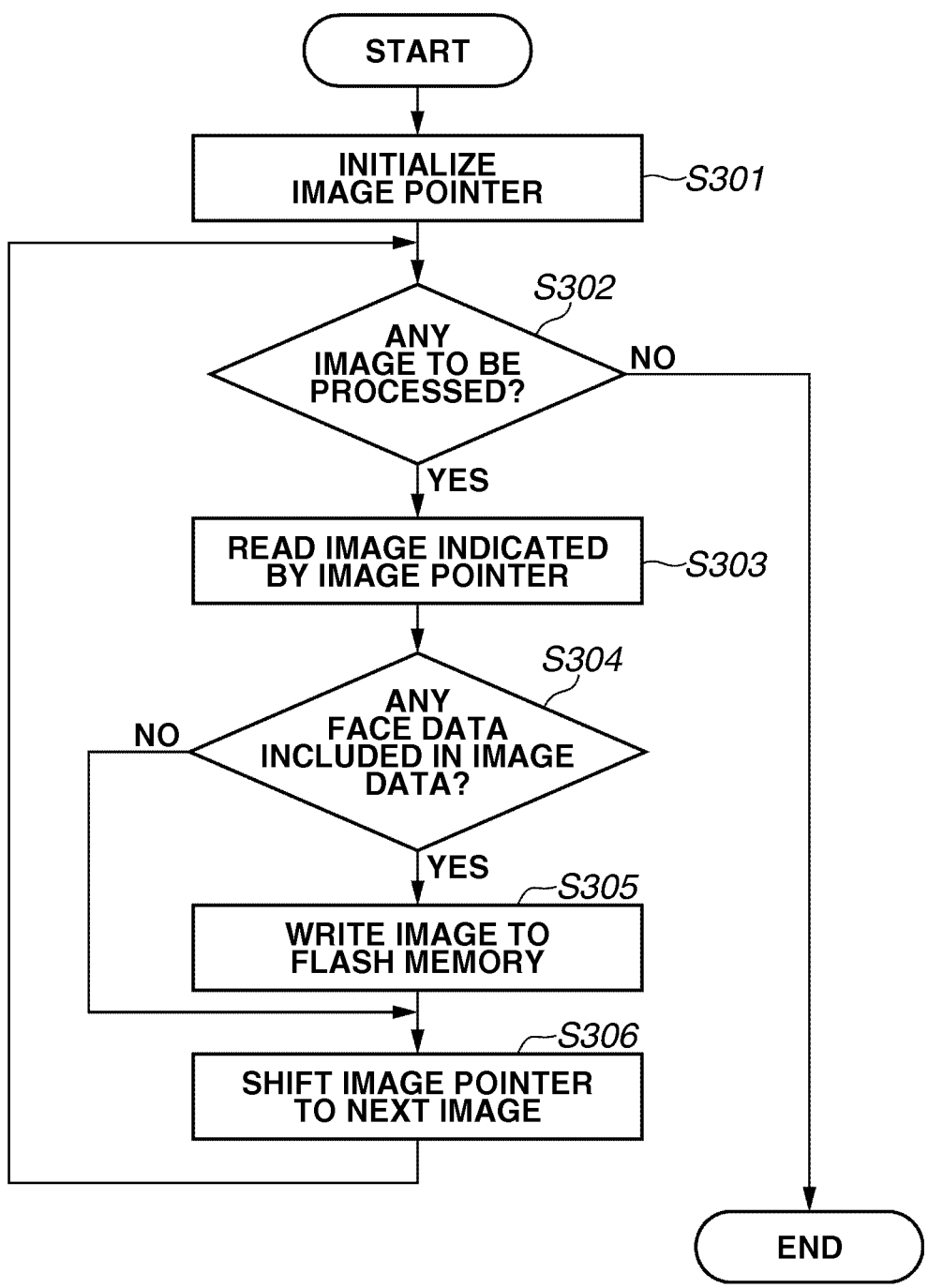
FIG. 3 is a flowchart illustrating an example procedure of processing performed by the pattern recognition apparatus according to the first exemplary embodiment of the present invention.

FIG. 3 is a flowchart illustrating an example procedure of processing performed by the pattern recognition apparatus according to the first exemplary embodiment of the present invention. More specifically, FIG. 3 is a flowchart illustrating an example processing procedure for the functional configuration illustrated in FIG. 2.

In step S301, the image reading unit 201 initializes an image pointer so that the image pointer indicates initial image data. In this exemplary embodiment, the image pointer is a variable successively designating image data (image files) stored in the hard disk 104.

In step S302, the image reading unit 201 determines whether image data to be processed is present in the hard disk 104. If the image reading unit 201 determines that there is no image data to be processed (NO in step S302), namely, when the processing has been completed for all image data, the image reading unit 201 terminates the processing of this routine.

Figure 4:
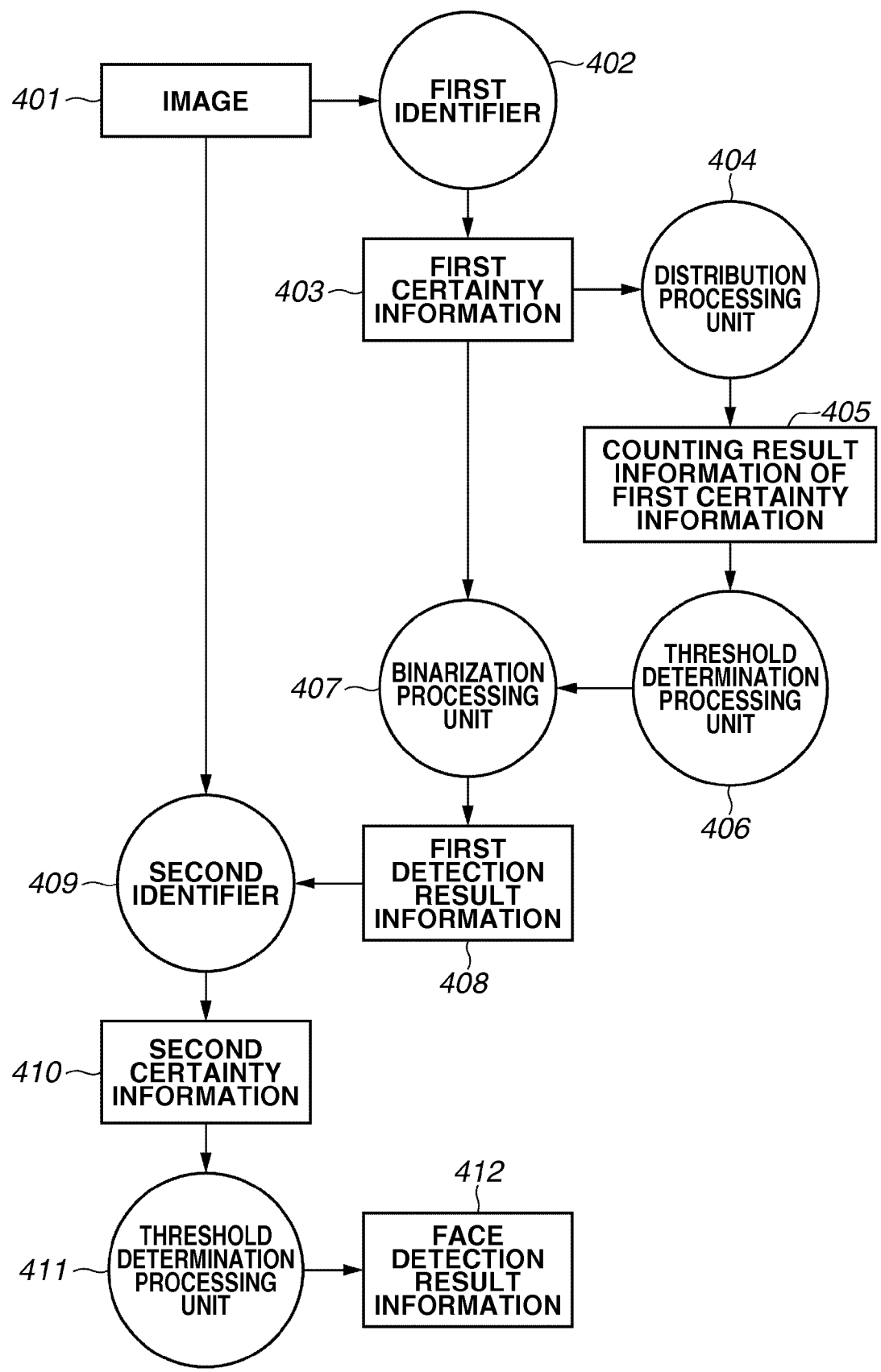
FIG. 4 illustrates an example procedure of face detection processing performed in step S304 illustrated in FIG. 3.

On the other hand, if the image reading unit 201 determines that there is image data to be processed (YES in step S302), the processing proceeds to step S303. In step S303, the image reading unit 201 reads out the image data currently indicated by the image pointer from the hard disk 104 to load it into the RAM 103. In step S304, the face detection unit 202 determines whether the image data loaded into the RAM 103 in step S303 includes face data. As described below, FIG. 4 illustrates an example method for the determination processing in step S304.

If the face detection unit 202 determines that the image data includes face data (YES in step S304), the processing proceeds to step S305. In step S305, the image writing unit 203 writes, into the flash memory 105, the image data loaded to the RAM 103.

After the processing of step S305 is completed, or when the face detection unit 202 determines that there is no face data in the image data (NO in step S304), the processing proceeds to step S306. In step S306, the image reading unit 201 shifts the image pointer to the next image data (image files) stored in the hard disk 104. Then, the processing returns to step S302.

Through the above-described processing of steps S301 to S306, the face detection unit 202 can accomplish the face detection processing for all image data stored in the hard disk 104.

FIG. 4 illustrates an example procedure of the face detection processing performed in step S304 illustrated in FIG. 3. The face detection unit 202, performing the face detection processing in step S304 illustrated in FIG. 3, includes a first identifier 402, a distribution processing unit 404, a threshold determination processing unit 406, a binarization processing unit 407, a second identifier 409, and a threshold determination processing unit 411, which are illustrated as circular blocks in FIG. 4.

Figure 7:
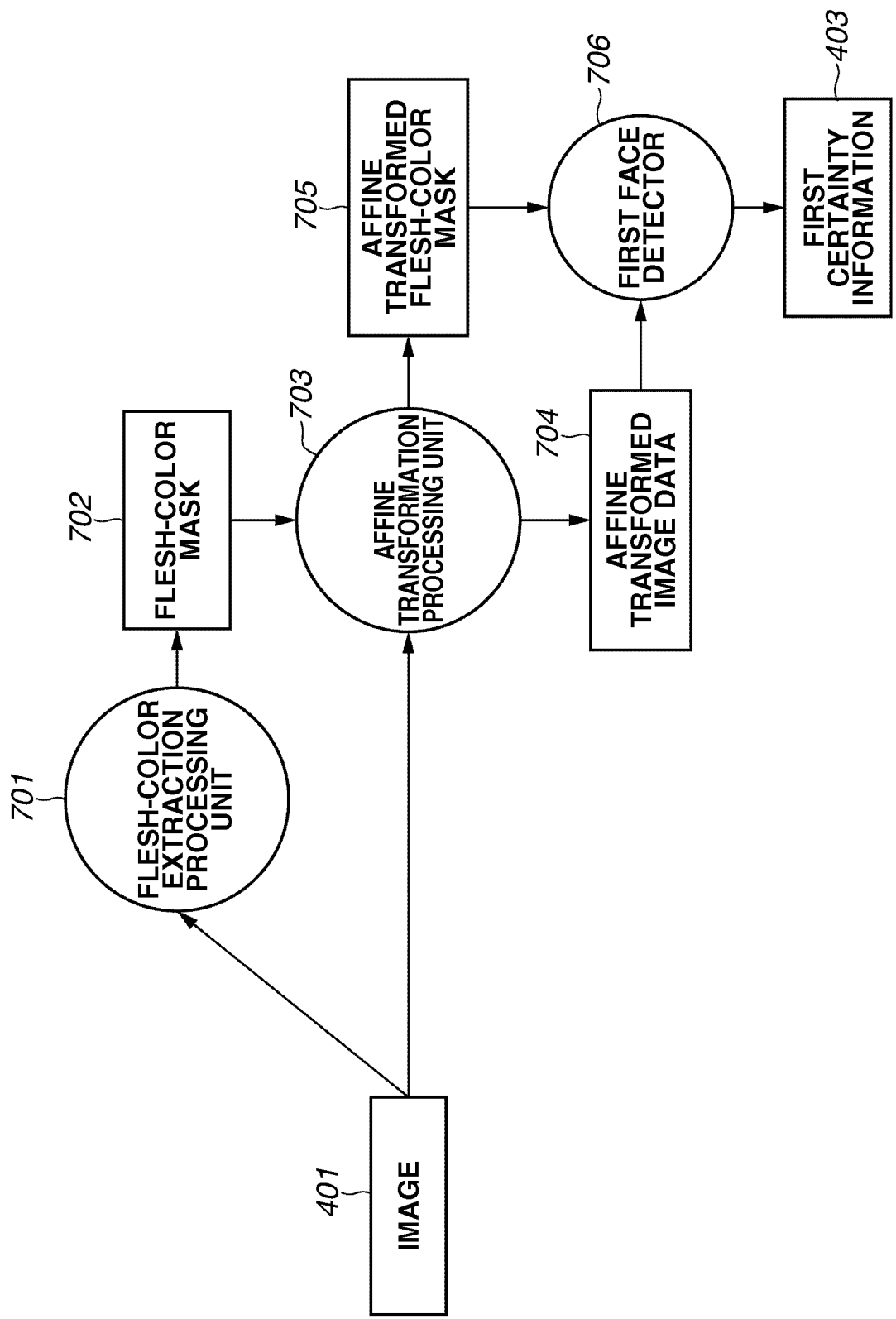
FIG. 7 illustrates an example detailed procedure of processing performed by a first identifier illustrated in FIG. 4.

In FIG. 4, image data 401 is the image data loaded into the RAM 103 by the image reading unit 201 in step S303. The first identifier 402 obtains a certainty at which each image region of the image data 401 includes a respective one of first to n-th (n being a natural number equal to or greater than 2) classification face patterns. As described below, FIG. 7 illustrates details of the first identifier 402.

Figure 5:
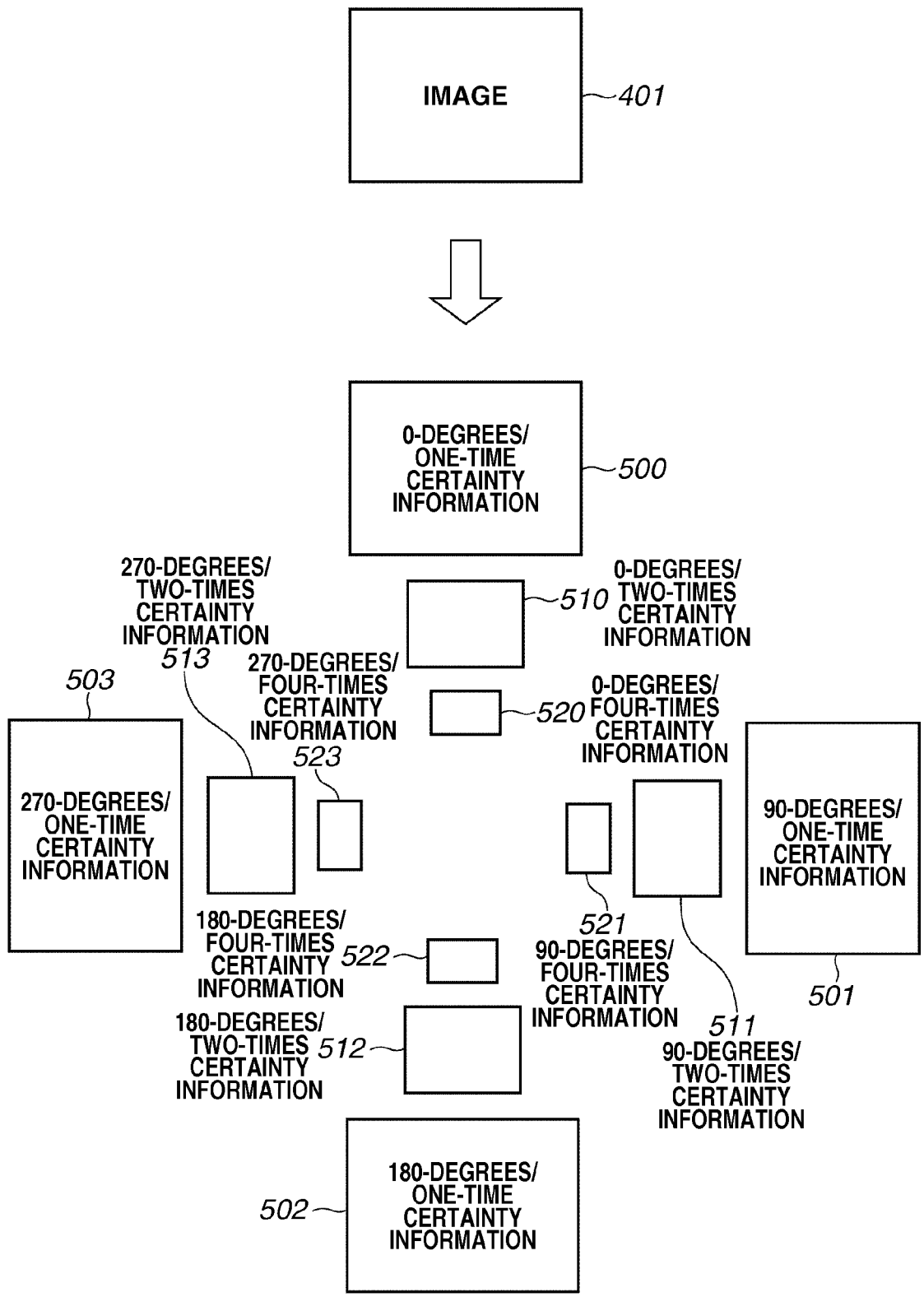
FIG. 5 illustrates an example format for first certainty information illustrated in FIG. 4.

The first identifier 402 generates first certainty information 403, which includes two or more pieces of information disposed in a two-dimensional pattern. For example, the RAM 103 stores the first certainty information 403. As described below, FIG. 5 illustrates an example format for the first certainty information 403.

The distribution processing unit 404 performs processing for distributing certainties to a plurality of bins according to their values, to reduce the processing time of the first certainty information 403. The distribution processing unit 404 generates counting result information 405 of the first certainty information. For example, the counting result information 405 of the first certainty information is a distribution of certainties obtained by the first identifier 402.

Figure 6:
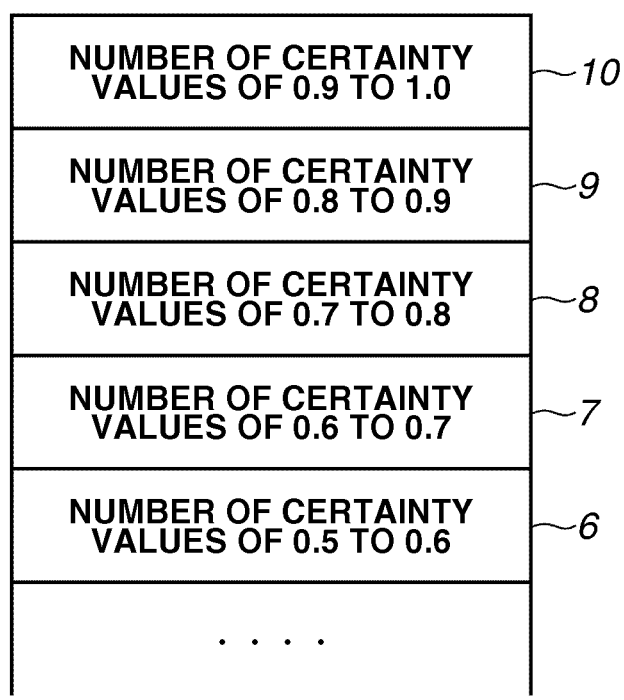
FIG. 6 illustrates an example format for counting result information of the first certainty information illustrated in FIG. 4.

The counting result information 405 of the first certainty information is information indicating a processing result generated by the distribution processing unit 404. For example, the RAM 103 stores the counting result information 405 of the first certainty information. As described below, FIG. 6 illustrates an example format for the counting result information 405 of the first certainty information.

Figure 8:
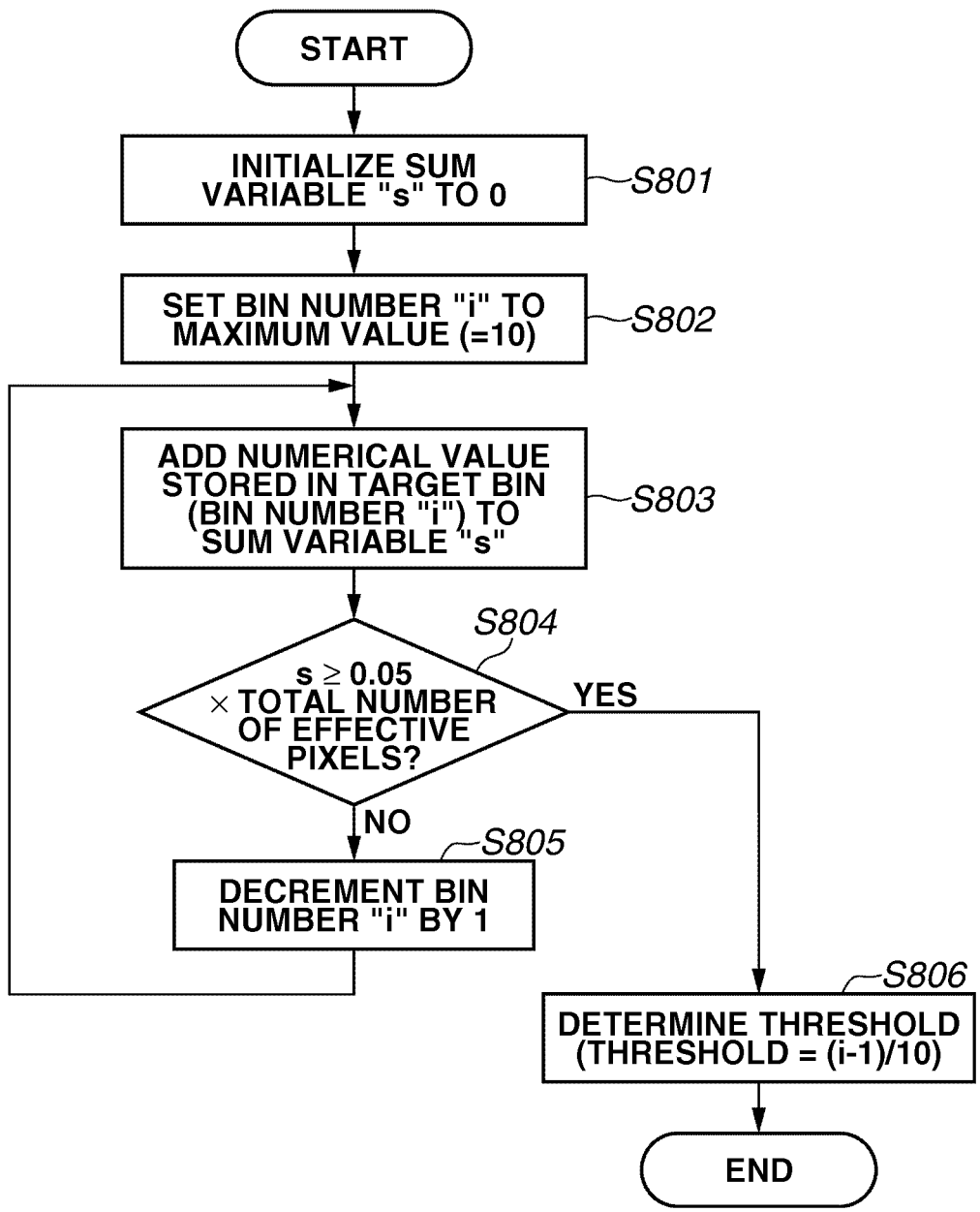
FIG. 8 is a flowchart illustrating an example detailed procedure of processing performed by a threshold determination processing unit illustrated in FIG. 4.

The threshold determination processing unit 406 determines a threshold to be applied to the first certainty information 403 based on the counting result information 405 of the first certainty information. As described below, FIG. 8 illustrates example processing performed by the threshold determination processing unit 406.

The binarization processing unit 407 performs binarization processing on the first certainty information 403 with a threshold determined by the threshold determination processing unit 406. The binarization processing unit 407 selects one or more image regions having a relatively high-level certainty (the relatively high-level certainty being established as a threshold certainty) from among the certainties obtained by the first identifier 402, or one or more classifications (inclination and size of a face according to an exemplary embodiment), or one or more combinations of the image region and the classification.

The binarization processing unit 407 outputs first detection result information 408, which is resultant from the binarization processing. The first detection result information 408 includes an array of candidates to be processed by the second identifier 409. More specifically, the first detection result information 408 indicates a rotational angle and a reduction rate in the processing of each image region included in the image data 401. For example, the RAM 103 stores the first detection result information 408. An example format for the first detection result information 408 is similar to the format for the first certainty information 403, although elements disposed in a two-dimensional pattern are binary data.

The second identifier 409 performs face detection processing on the image data 401 based on the first detection result information 408. The second identifier 409 outputs second certainty information 410, which is resultant from the processing. For example, the RAM 103 stores the second certainty information 410.

As the second certainty information 410 is multi-valued information, the threshold determination processing unit 411 scans and determines whether any value exceeding a threshold is present. The threshold determination processing unit 411 outputs face detection result information 412, which is resultant from the determination processing. The face detection result information 412 indicates the presence of a face involved in the image data 401, when the threshold determination processing unit 411 determines that there is a value exceeding the threshold. For example, the RAM 103 stores the face detection result information 412. The face detection result information 412 is used in the face detection processing performed in step S304 illustrated in FIG. 3.

The second identifier 409 and the threshold determination processing unit 411 perform face detection processing on the image data 401, according to the image region selected by the binarization processing unit 407, the classification, or a combination of the image region and the classification.

FIG. 5 illustrates an example format for the first certainty information 403 illustrated in FIG. 4. In FIG. 5, the first identifier 402 can identify 0 degrees, 90 degrees, 180 degrees, and 270 degrees in the inclination of face and can identify one time, two times, and four times in the size of face. In an example embodiment, the face size of one time indicates a minimum face size (e.g., 30 pixels in face width). The face size of two times has a face width of 60 pixels. The description of the embodiment uses magnifications representing face sizes instead of using numerical values, because the numerical values are not relevant to the gist of the invention.

Image data 401 illustrated in FIG. 5 is similar to the image data 401 illustrated in FIG. 4. FIG. 5 illustrates twelve pieces of certainty information 500 to 503, 510 to 513, and 520 to 523, as detailed contents of the first certainty information 403.

The 0-degrees/one-time certainty information 500 is certainty information relating to a face of 0 degrees in inclination and one time in size, i.e., certainty information indicating that 0-degrees/one-time face is present in a corresponding region of the image data 401 (an element of the two-dimensional pattern).

Similarly, the 90-degrees/one-time certainty information 501 is certainty information relating to a face of 90 degrees in inclination and one time in size. The 180-degrees/one-time certainty information 502 is certainty information relating to a face of 180 degrees in inclination and one time in size. The 270-degrees/one-time certainty information 503 is certainty information relating to a face of 270 degrees in inclination and one time in size.

The 0-degrees/two-times certainty information 510 is certainty information relating to a face of 0 degrees in inclination and two times in size. The 90-degrees/two-times certainty information 511 is certainty information relating to a face of 90 degrees in inclination and two times in size. The 180-degrees/two-times certainty information 512 is certainty information relating to a face of 180 degrees in inclination and two times in size. The 270-degrees/two-times certainty information 513 is certainty information relating to a face of 270 degrees in inclination and two times in size.

The 0-degrees/four-times certainty information 520 is certainty information relating to a face of 0 degrees in inclination and four times in size. The 90-degrees/four-times certainty information 521 is certainty information relating to a face of 90 degrees in inclination and four times in size. The 180-degrees/four-times certainty information 522 is certainty information relating to a face of 180 degrees in inclination and four times in size. The 270-degrees/four-times certainty information 523 is certainty information relating to a face of 270 degrees in inclination and four times in size.

More specifically, the first certainty information 403 illustrated in FIG. 4, when it has accomplished the classification of face in inclination and size, has a plurality pieces of certainty information (i.e., from certainty information relating to a first classification face to certainty information relating to an n-th classification face) A first image pattern includes a first classification face. An n-th image pattern includes an n-th classification face. The example illustrated in FIG. 5 includes certainty information relating to the first classification face to certainty information relating to the twelfth classification face (i.e., twelve pieces of certainty information 500 to 503, 510 to 513, and 520 to 523).

The example illustrated in FIG. 5 includes twelve pieces of certainty information classified into four types (0 degrees, 90 degrees, 180 degrees, and 270 degrees) in face inclination, as an example of a plurality of inclinations (first inclination to n-th inclination (n is a natural number equal to or greater than 2)).

Furthermore, the example illustrated in FIG. 5 includes twelve pieces of certainty information classified into three types (one time, two times, and four times) in face size, as an example of a plurality of sizes (first size to n-th size (n is a natural number equal to or greater than 2).

In FIG. 5, dimensions of the certainty information relating to a face having a two-times or four-times size (510 to 513 or 520 to 523) is illustrated as ½ or ¼ times the dimensions of the certainty information relating to a face having a one-time size (500 to 503). This is because the identifier can identify a face having an enlarged size (two times or four times) by appropriately reducing the size of the image data 401. According to an exemplary embodiment, when input image data has a reduced size, the identifier outputs small certainty information correspondingly.

The RAM 103 illustrated in FIG. 1 rasterizes each one (two-dimensional information) of the twelve pieces of certainty information 500 to 503, 510 to 513, and 520 to 523 illustrated in FIG. 5. A point on two-dimensional certainty information corresponds to a region on the image data 401 and indicates a certainty at which the region includes a face having a predetermined inclination and a predetermined size.

For example, a point (x, y) on the 0-degrees/one-time certainty information 500 indicates a certainty at which a rectangular region having a diagonal connecting two points (x−w/2, y−h/2) and (x+w/2, y+h/2) on the image data 401 includes a 0-degrees/one-time face. In this case, "w" represents a minimum face width and "h" represents a minimum face height.

Similarly, a point (x, y) on the 90-degrees/n-times certainty information indicates a certainty at which a rectangular region having a diagonal connecting two points (n(y−h/2), H−n(x+w/2)) and (n(y+h/2, H−n(x−w/2)) on the image data 401 includes a 90-degrees/n-times face. In this case, "W" represents the width of the image data 401 and "H" represents the height of the image data 401. A point (x,y) on the 180-degrees/n-times certainty information indicates a certainty at which a rectangular region having a diagonal connecting two points (W−n(x+w/2), H−n(y+h/2)) and (W−n(x−w/2), H−n (y−h/2)) on the image data 401 includes a 180-degrees/n-times face. A similar definition is applicable to the 270 degrees/n-times certainty information.

The second certainty information 410 illustrated in FIG. 4 has a format similar to that of the first certainty information 403. As described below, the number of the second identifier 409 can be greater than the number of the first identifier 402. In this case, the number of the second certainty information 410 disposed in a two-dimensional pattern is greater than the number of the first certainty information 403 disposed in a two-dimensional pattern.

FIG. 6 illustrates an example format for the counting result information 405 of the first certainty information illustrated in FIG. 4. For example, the RAM 103 can rasterize the format for the counting result information 405 of the first certainty information illustrated in FIG. 6. According to the example illustrated in FIG. 6, the maximum value of the certainty of the first certainty information 403 is 1.0. FIG. 6 illustrates a bin number allocated to each bin.

Bin 10 stores the number of two-dimensional data constituting the first certainty information 403 whose certainty is greater than 0.9 and equal to or less than 1.0. Bin 9 stores the number of two-dimensional data constituting the first certainty information 403 whose certainty is greater than 0.8 and equal to or less than 0.9. Bin 8 stores the number of two-dimensional data constituting the first certainty information 403 whose certainty is greater than 0.7 and equal to or less than 0.8. Bin 7 stores the number of two-dimensional data constituting the first certainty information 403 whose certainty is greater than 0.6 and equal to or less than 0.7. Bin 6 stores the number of two-dimensional data constituting the first certainty information 403 whose certainty is greater than 0.5 and equal to or less than 0.6. Each of Bins 1 to 5 has a storage configuration similar to the above-described configuration.

In this manner, the distribution processing unit 404 generates a certainty distribution of certainty values relating to the two-dimensional information stored in the first certainty information 403, by classifying the certainty values into respective bins according to the magnitude of each certainty value, as two-dimensional data constituting the first certainty information 403. For example, the distribution processing unit 404 generates a histogram representing a distribution of certainty. Numerical values, including the number of bins, illustrated in FIG. 6 are mere examples and are arbitrarily changeable.

FIG. 7 illustrates an example detailed procedure of processing performed by the first identifier 402 illustrated in FIG.

4. The first identifier 402 includes a flesh-color extraction processing unit 701, an affine transformation processing unit 703, and a first face detector 706, which are illustrated as circular blocks in FIG. 7.

Image data 401 illustrated in FIG. 7 is similar to the image data 401 illustrated in FIG. 4. The flesh-color extraction processing unit 701 performs flesh-color pixel extraction processing on the image data 401. More specifically, the flesh-color extraction processing unit 701 writes "1" to a portion corresponding to a flesh-color pixel of the image data 401 and "0" to a portion corresponding to a non-flesh-color pixel, and generates a flesh-color mask 702. For example, the RAM 103 stores the generated flesh-color mask 702.

The affine transformation processing unit 703 performs affine transformation processing for rotating and reducing the image data 401 and the flesh-color mask 702. More specifically, when the first identifier 402 obtains certainties including the first classification image pattern to the n-th classification image pattern, the affine transformation processing unit 703 uses a total of n methods for converting the image data 401.

For example, the RAM 103 stores affine transformed image data 704 as a result of the image data 401 that is rotated and reduced by the affine transformation processing unit 703. For example, the RAM 103 stores an affine transformed flesh-color mask 705 as a result of the flesh-color mask 702 that is rotated and reduced by the affine transformation processing unit 703.

In this case, a rectangular layout is convenient for calculation of some rotational angles. The affine transformed image data 704 and the affine transformed flesh-color mask 705 may include ineffective pixels that do not correspond to the image data 401 and the flesh-color mask 702. Such ineffective pixels are negligible in subsequent processing.

The first face detector 706 obtains a certainty at which a face is present at a position on the affine transformed image data 704 corresponding to the position to which the affine transformed flesh-color mask 705 writes "1." Although not illustrated in FIG. 7, the affine transformation processing unit 703 and the first face detector 706 repetitively perform the loop processing to obtain a required amount of certainty information.

For example, to identify the face inclination classified into one of four groups (0 degrees, 90 degrees, 180 degrees, and 270 degrees) and the face size classified into one of three groups (one time, two times, and four times), the affine transformation processing unit 703 and the first face detector 706 repetitively perform the loop processing twelve times in total. As a result, the exemplary embodiment can prepare twelve pieces of certainty information as the first certainty information 403.

Figure 10:
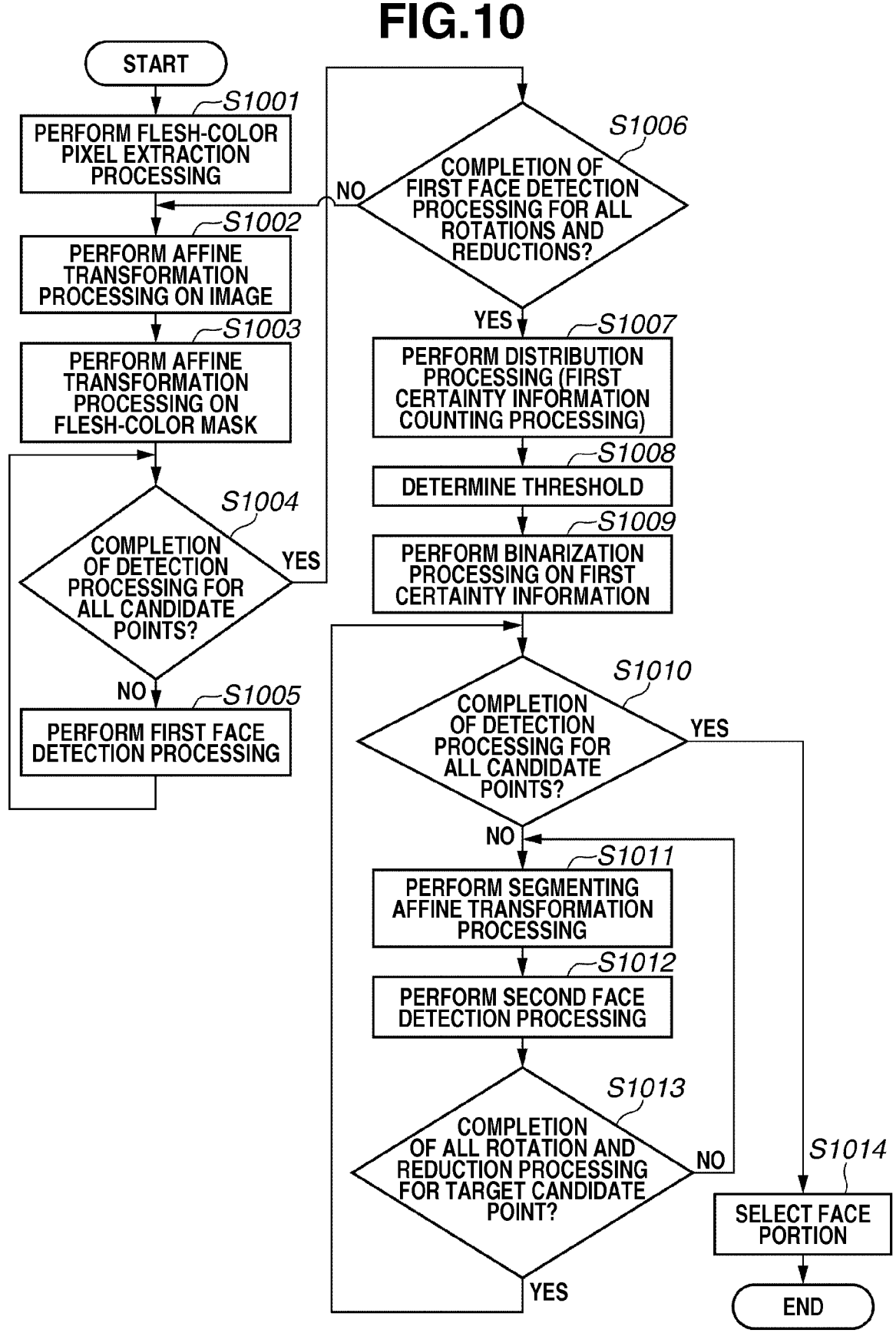
FIG. 10 is a flowchart illustrating an example detailed procedure of processing performed in step S304 illustrated in FIG. 3.

As described below, FIG. 10 illustrates an example loop execution method. For example, the first face detector 706 can use an object recognition method discussed in Japanese Patent No. 3078166. Furthermore, the first face detector 706 can use the neural network discussed in Japanese Patent Application Laid-Open No. 2002-8032 or Japanese Patent Application Laid-Open No. 2002-8033, or other pattern recognition method.

FIG. 8 is a flowchart illustrating an example detailed procedure of processing performed by the threshold determination processing unit 406 illustrated in FIG. 4.

In step S801, the threshold determination processing unit 406 initializes a sum variable "s" to 0. The sum variable "s" is a variable representing a sum.

In step S802, the threshold determination processing unit 406 sets a bin number "i" to a maximum value (=10). The bin number "i" is a variable representing a number allocated to a target bin. Namely, the threshold determination processing unit 406 sets, as a target bin number, bin 10 illustrated in FIG. 6.

In step S803, the threshold determination processing unit 406 adds, to the sum variable "s", a numerical value representing the number of certainty values stored in the target bin (bin number "i").

In step S804, the threshold determination processing unit 406 determines whether the sum variable "s" is equal to or greater than 5% of the total number of effective pixels constituting the first certainty information 403. The effective pixels are pixels other than ineffective pixels of the affine transformed image data 704.

If the threshold determination processing unit 406 determines that the sum variable "s" is smaller than 5% of the total number of effective pixels constituting the first certainty information 403 (NO in step S804), the processing proceeds to step S805.

In step S805, the threshold determination processing unit 406 decrements the bin number "i" by 1 to change the target bin. The processing returns to step S803. Then, the threshold determination processing unit 406 repetitively executes the loop processing of steps S803 and S805 until the sum variable "s" becomes equal to or greater than 5% of the total number of effective pixels constituting the first certainty information 403 in step S804.

If the threshold determination processing unit 406 determines that the sum variable "s" equal to or greater than 5% of the total number of effective pixels constituting the first certainty information 403 (YES in step S804), the processing proceeds to step S806. In step S806, the threshold determination processing unit 406 determines a threshold. More specifically, the threshold determination processing unit 406 sets a threshold to be equal to $(i-1)/10$.

Through the above-described processing of steps S801 to S806, the threshold determination processing unit 406 can accomplish the processing for determining a threshold based on the counting result information 405 of the first certainty information illustrated in FIG. 6.

The numerical values (5% and 10) used in steps S804 and S802 are mere example values and appropriately changeable.

Figure 9:
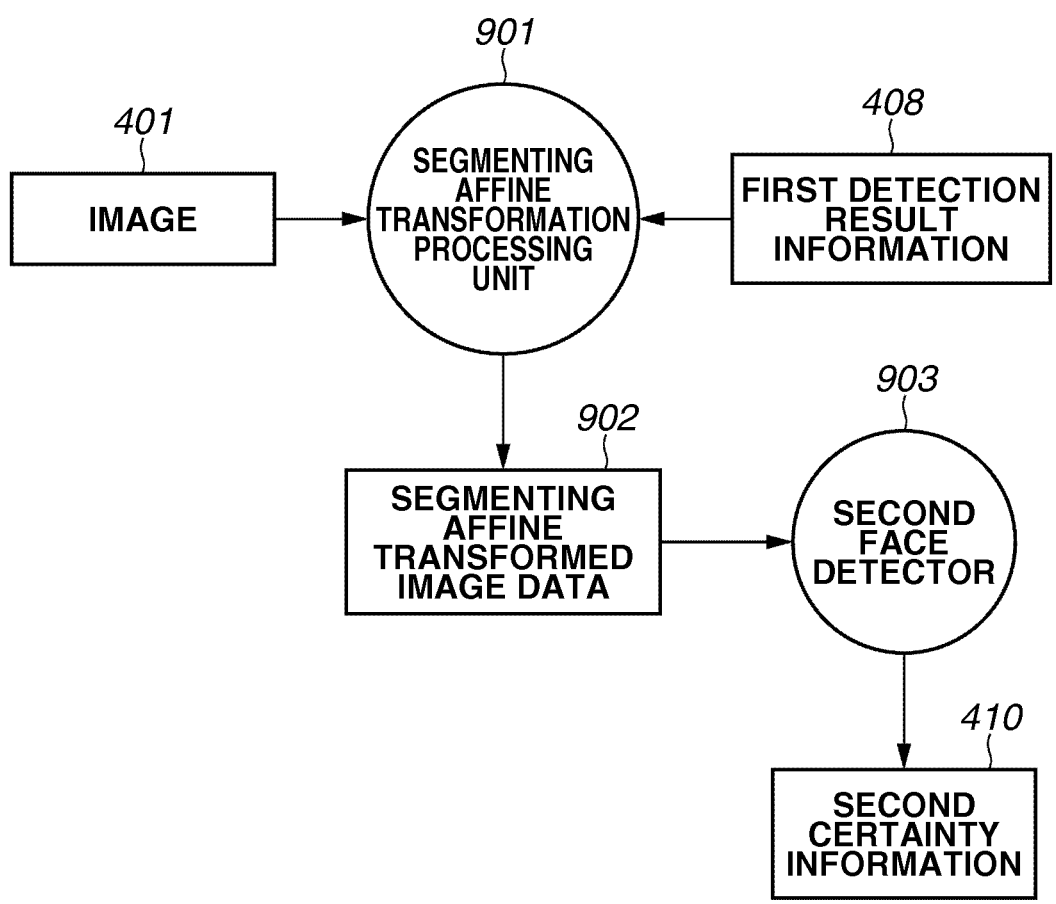
FIG. 9 illustrates an example detailed procedure of processing performed by a second identifier illustrated in FIG. 4.

FIG. 9 illustrates an example detailed procedure of processing performed by the second identifier 409 illustrated in FIG. 4. The second identifier 409 includes a segmenting affine transformation processing unit 901 and a second face detector 903, which are illustrated as circular blocks in FIG. 9.

Image data 401 illustrated in FIG. 9 is similar to the image data 401 illustrated in FIG. 4. First detection result information 408 illustrated in FIG. 9 is similar to the first detection result information 408 illustrated in FIG. 4. The segmenting affine transformation processing unit 901 performs affine transformation processing for segmenting a corresponding region from the image data 401 and rotating/reducing the segmented region according to the content of the first detection result information 408. For example, the RAM 103 stores, as segmenting affine transformed image data 902, a result of the affine transformation processing performed by the segmenting affine transformation processing unit 901.

The second face detector 903 detects a face included in the segmenting affine transformed image data 902. For example, the RAM 103 stores the second certainty information 410 indicating a certainty at which a face is present. Second certainty information 410 illustrated in FIG. 9 is similar to the second certainty information 410 illustrated in FIG. 4.

The second face detector 903, capable of performing face detection processing, can have a configuration similar or dissimilar to that of the first face detector 706. When the second face detector 903 is similar to the first face detector 706, the second face detector 903 desirably has parameters different from those of the first face detector 706. More specifically, in view of processing speed, it is effective that the first face detector 706 has higher robustness compared to the second face detector 903.

For example, the first face detector 706 can be configured to detect a face inclination in the range of ±45 degrees. The second face detector 903 can be configured to detect a face inclination in the range of ±15 degrees. In this case, a loop including the processing by the affine transformation processing unit 703 and the processing by the first face detector 706 is responsive to respective rotations of 0 degrees, 90 degrees, 180 degrees, and 270 degrees.

The segmenting affine transformation processing unit 901 performs processing corresponding to respective rotations of 0 degrees, 30 degrees, 60 degrees, 90 degrees, 120 degrees, 150 degrees, 180 degrees, 210 degrees, 240 degrees, 270 degrees, 300 degrees, and 330 degrees. Thus, the segmenting affine transformation processing unit 901 can accurately perform face detection processing.

When no reduction is taken into consideration, in the first detection result information 408, for example, if a face candidate is present at the angle of 90 degrees, the segmenting affine transformation processing unit 901 performs processing at three angles of 60 degrees, 90 degrees, and 120 degrees. Similar processing is performed for other angles. A similar method is applicable to the reduction rate.

FIG. 10 is a flowchart illustrating an example detailed procedure of processing performed in step S304 illustrated in FIG. 3. The flowchart of FIG. 10 includes the processing procedures described in FIGS. 4, 7, and 9.

In step S1001, the flesh-color extraction processing unit 701 of the first identifier 402 illustrated in FIG. 7 performs flesh-color pixel extraction processing on the image data 401. More specifically, as described above, the flesh-color extraction processing unit 701 writes "1" to a position of the image data 401 corresponding to a flesh-color pixel and "0" to a position corresponding to a non-flesh-color pixel. Then, the flesh-color extraction processing unit 701 generates the flesh-color mask 702. For example, the RAM 103 stores the generated flesh-color mask 702.

In step S1002, the affine transformation processing unit 703 of the first identifier 402 performs affine transformation processing on the image data 401 to rotate and reduce the image. For example, the RAM 103 stores a result of the affine transformation processing, as the affine transformed image data 704.

In step S1003, the affine transformation processing unit 703 performs affine transformation processing on the flesh-color mask 702 to rotate and reduce the mask. For example, the RAM 103 stores a result of the affine transformation processing, as the affine transformed flesh-color mask 705.

In step S1004, the first identifier 402 determines whether the certainty at which a face is present in each region of the corresponding affine transformed image data 704 is obtained for all candidate points on the affine transformed flesh-color mask 705.

If the first identifier 402 determines that the processing for obtaining a certainty at which a face is present in each region of the corresponding affine transformed image data 704 has not been accomplished for all candidate points on the affine transformed flesh-color mask 705 (NO in step S1004), the processing proceeds to step S1005.

In step S1005, the first face detector 706 of the first identifier 402 performs first face detection processing for detecting a face in a region of the affine transformed image data 704 corresponding to an unprocessed candidate point on the affine transformed flesh-color mask 705.

More specifically, the first face detector 706 obtains a certainty at which a face is present in a region of the affine transformed image data 704. Then, the first face detector 706 stores the obtained certainty in a corresponding portion of the first certainty information 403. For example, the RAM 103 stores the first certainty information 403.

For example, when the first face detector 706 uses a neural network to perform the processing of step S1005, the loop processing of steps S1004 and S1005 can be integrally realized by packaging the neural network. This is because the neural network can improve the calculation efficiency by using a common calculation result for candidate points positioned closely.

If the first identifier 402 determines that the processing for obtaining a certainty at which a face is present in each region of the corresponding affine transformed image data 704 has been accomplished for all candidate points on the affine transformed flesh-color mask 705 (YES in step S1004), the processing proceeds to step S1006. In step S1006, the first identifier 402 determines whether the processing of steps S1002 to S1005 has been completed for all parameters representing rotational angles and reduction rates. If the first identifier 402 determines that the processing of steps S1002 to S1005 has not been completed for all rotation and reduction parameters (NO in step S1006), the processing returns to step S1002.

If the first identifier 402 determines that the processing of steps S1002 to S1005 has been completed for all rotation and reduction parameters (YES in step S1006), the processing proceeds to step S1007.

In step S1007, the distribution processing unit 404 illustrated in FIG. 4 counts the content of the first certainty information 403 to determine a threshold used in the next step S1008. More specifically, the distribution processing unit 404 performs processing for distributing each certainty of the first certainty information 403 to one of the bins illustrated in FIG. 6 according to its value, as illustrated in FIG. 6. For example, the RAM 103 stores a result of the distribution processing performed by the distribution processing unit 404, as the counting result information 405 of the first certainty information.

In step S1008, the threshold determination processing unit 406 determines a threshold to be applied to the first certainty information 403 based on the counting result information 405 of the first certainty information. The determined threshold is usable for the binarization processing applied to the first certainty information 403. An example determination method is the above-described method described with reference to the flowchart of FIG. 8.

In step S1009, the binarization processing unit 407 converts (separates) the first certainty information 403 into binary data ("0" or "1") using the threshold determined in step S1008. For example, the RAM 103 stores the obtained binary data as the first detection result information 408. Thus, the binarization processing unit 407 can generate (select) a plurality sets of face candidate regions of the image data 401 associated with rotational angle and size data. The processing of steps S1010 to S1014 is executed based on the selection result.

In step S1010, the second identifier 409 determines whether the processing of steps S1011 to S1013 has been completed for all candidate points of the first detection result information 408.

If the second identifier 409 determines the processing of steps S1011 to S1013 has not been completed for all candidate points of the first detection result information 408 (NO in step S1010), the processing proceeds to step S1011.

In step S1011, the segmenting affine transformation processing unit 901 of the second identifier 409 illustrated in FIG. 9 performs segmenting affine transformation processing on the image data 401 according to the content of the first detection result information 408. More specifically, the segmenting affine transformation processing unit 901 performs affine transformation processing on each segmented portion of the image data 401 according to the rotational angle and the reduction rate corresponding to the candidate region of the first detection result information 408. For example, the RAM 103 stores a result of the segmenting affine transformation processing performed by the segmenting affine transformation processing unit 901, as the segmenting affine transformed image data 902.

In step S1012, the second face detector 903 of the second identifier 409 illustrated in FIG. 9 performs second face detection processing for detecting a face in the segmenting affine transformed image data 902. More specifically, the second face detector 903 obtains a certainty at which a face is present in the segmenting affine transformed image data 902. Then, the second face detector 903 stores the obtained certainty in a corresponding portion of the second certainty information 410. For example, the RAM 103 stores the second certainty information 410.

In step S1013, the second identifier 409 determines whether rotation and reduction processing has been completed for a target candidate point of the first detection result information 408. If the second identifier 409 determines that the rotation and reduction processing for the target candidate point of the first detection result information 408 has not been completed (NO in step S1013), the processing returns to step S1011. The second identifier 409 repeats the loop processing of steps S1011 to S1013.

If the second identifier 409 determines that the rotation and reduction processing for the target candidate point of the first detection result information 408 has been completed (YES in step S1013), the processing returns to step S1010. If the second identifier 409 determines that the processing of steps S1011 to S1013 has been completed for all candidate points of the first detection result information 408 (YES in step S1010), the processing proceeds to step S1014.

In step S1014, the threshold determination processing unit 411 selects a face candidate portion from the second certainty information 410. For example, the RAM 103 stores the selected portion as the face detection result information 412.

Through the processing of steps S1001 to S1014, the face detection unit 202 accomplishes the face detection processing of step S304 illustrated in FIG. 3. As described above, when a plurality of detectors (identifiers) cooperatively constitute the first identifier 402, it is desirable to execute the loop processing effectively. For example, if the processing of both the first identifier 402 and the second identifier 409 is included in the same loop and the threshold determination processing unit 406 executes the processing for each loop, the second identifier 409 may perform the processing unnecessarily.

For example, in the face detection processing, two or more faces existing in the image data 401 tend to have similar inclinations. If many faces have inclinations equal or close to 0 degree, very few faces have inclinations equal or close to 180 degrees. Nevertheless, if the threshold determination processing unit 406 executes the processing in each loop, the threshold determination processing unit 406 determines a threshold as described above (see step S804) even when there is no face whose inclination is 180 degrees. In other words, the threshold may be set to a lower value unnecessarily. In this case, the second identifier 409 executes the processing unnecessarily for the region where there is no face having an inclination of 180 degrees.

In view of the foregoing problems, in an exemplary embodiment, the first face detector 706 repetitively executes the first face detection processing (step S1005) for all candidates. After the first face detector 706 has completed the detection processing, the threshold determination processing unit 406 executes the threshold determination processing (step S1008). Subsequently, the second face detector 903 executes the second face detection processing (step S1012) based on the first detection result information 408 obtained using the threshold.

As described above, an exemplary embodiment provides the threshold determination processing unit 406 configured to determine a threshold between the first identifier 402 and the second identifier 409. Thus, the threshold determination processing unit 406 can automatically adjust a threshold in the threshold processing.

An exemplary embodiment dynamically selects a high-level output value (threshold) instead of using a fixed threshold. Furthermore, an exemplary embodiment can perform threshold processing in an appropriate range obtained by effectively executing the loop processing, and can satisfy requirements in processing speed and identification accuracy.

More specifically, an exemplary embodiment extracts a plurality of relatively high-level values among all output values obtained by the first identifier 402. The second identifier 409 performs the processing on candidate points corresponding to the extracted output values. To select a plurality of high-level output values, an exemplary embodiment checks a distribution of output values and determines a threshold with reference to the distribution. Therefore, the exemplary embodiment does not perform the processing for sorting output values, which takes a significantly long time to complete.

Second Exemplary Embodiment

The present invention is applied to a tone signal detection apparatus as a pattern recognition apparatus according to an exemplary embodiment of the present invention, which is configured to input a Pulse Code Modulation (PCM) signal and recognize a pattern of a tone signal.

A pattern recognition apparatus (tone signal detection apparatus) according to the second exemplary embodiment is connected to a public telephone line and configured to detect if a user presses a push-button on a telephone. In this exemplary embodiment, the user's telephone can transmit tone signals regulated according to ITU-T Recommendation Q.24. The following table 1 illustrates example tone signals.

TABLE 1

| LOWER GROUP/Hz | HIGHER GROUP/Hz | | | |
| --- | --- | --- | --- | --- |
| | 1209 | 1336 | 1477 | 1633 |
| 697 | "1" | "2" | "3" | "A" |
| 770 | "4" | "5" | "6" | "B" |
| 582 | "7" | "8" | "9" | "C" |
| 941 | "*" | "0" | "#" | "D" |

Table 1 illustrates two classifications (first classification and second classification) of a lower-group frequency region and a higher-group frequency region. As illustrated in table 1, if a user presses a push-button "1", two signals of 697 Hz and 1209 Hz are transmitted simultaneously. If a user presses a push-button "2", two signals of 697 Hz and 1336 Hz are transmitted simultaneously. Similarly, if a user presses another push-button, two signals belonging to lower and higher groups are transmitted simultaneously according to the table 1.

Figure 11:
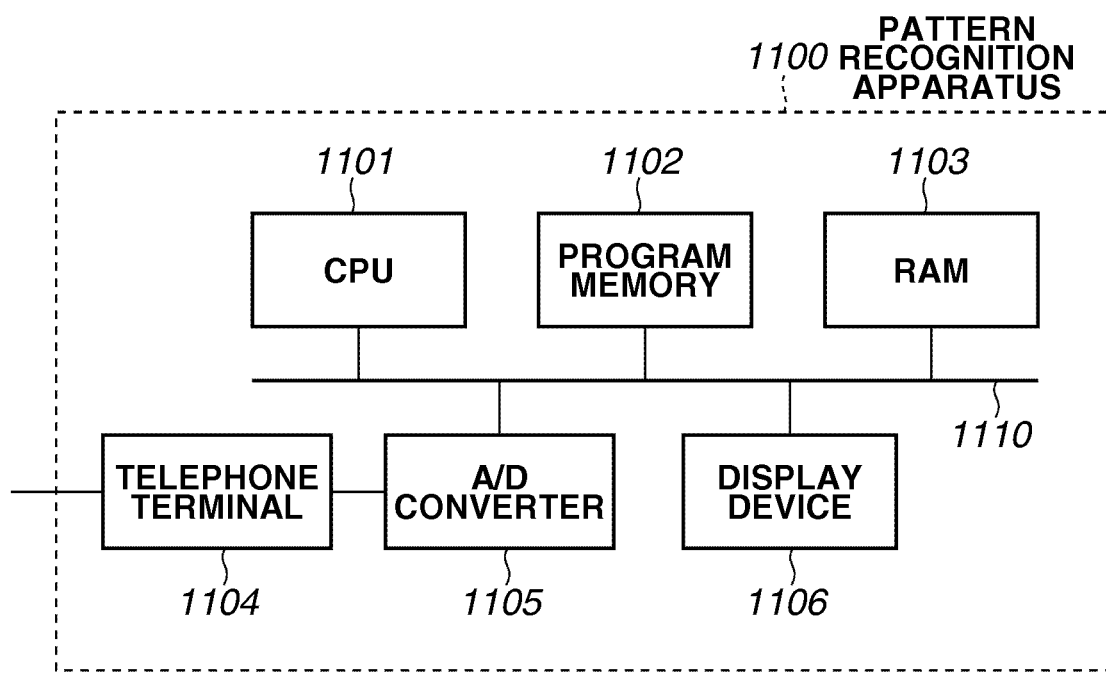
FIG. 11 is a block diagram illustrating an example hardware configuration of a pattern recognition apparatus according to a second exemplary embodiment of the present invention.

FIG. 11 is a block diagram illustrating an example hardware configuration of a pattern recognition apparatus 1100 according to the second exemplary embodiment of the present invention. As illustrated in FIG. 11, the pattern recognition apparatus 1100 includes a central processing unit (CPU) 1101, a program memory 1102, a random access memory (RAM) 1103, a telephone terminal 1104, an analog-digital (A/D) converter 1105, a display device 1106, and a control bus/data bus 1110.

The CPU 1101 integrally controls various operations performed by the pattern recognition apparatus 1100. For example, the CPU 1101 executes a program to realize a tone signal detection method according to an exemplary embodiment. The CPU 1101 can execute program(s) stored in the program memory 1102. The RAM 1103 temporarily stores various information and various data while the CPU 1101 executes the program(s).

The telephone terminal 1104 serves as an interface that connects the pattern recognition apparatus 1100 to a public telephone line. The A/D converter 1105 converts an analog signal entered from the telephone terminal 1104 into a digital signal. The display device 1106 presents, to a user, a detection result of the tone signal detection processing performed by the pattern recognition apparatus 1100, according to a command from the CPU 1101.

The control bus/data bus 1110 connects the CPU 1101 to the above-described devices 1101 to 1106.

Figure 12:
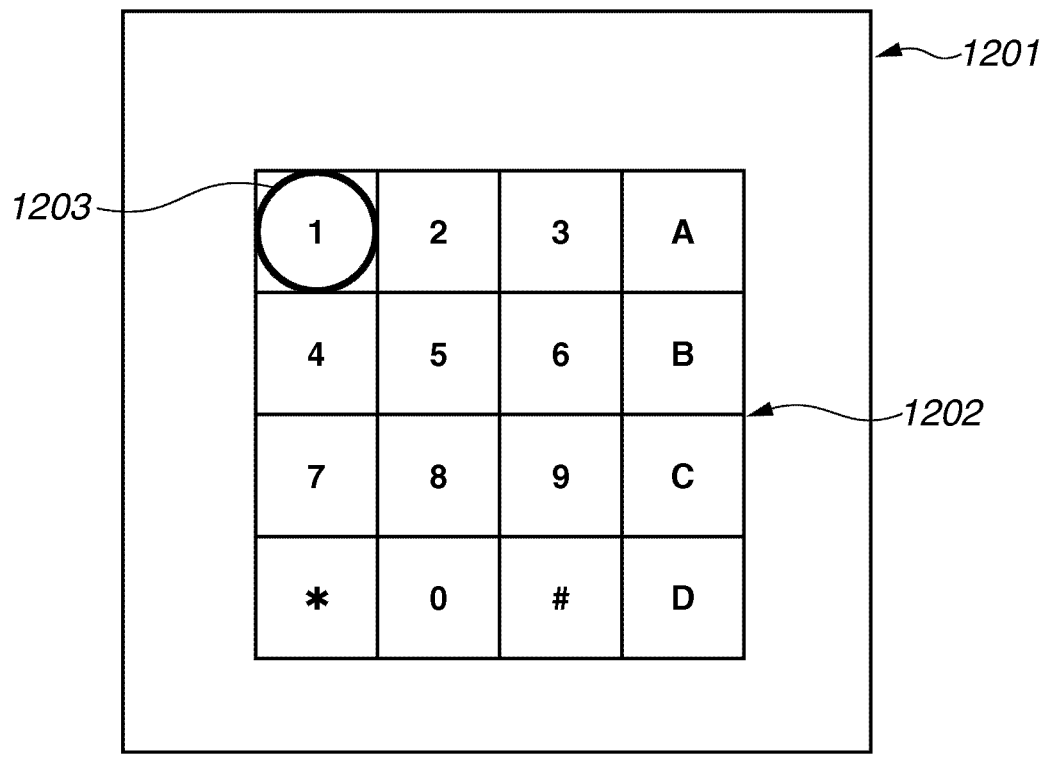
FIG. 12 illustrates an example display screen of a display device illustrated in FIG. 11.

FIG. 12 illustrates an example display screen of the display device 1106 illustrated in FIG. 11. A display screen 1201 of the display device 1106 includes sixteen push-buttons 1202 of a user's telephone, which are numerical buttons "0" to "9", alphabetical buttons "A" to "D", and symbol buttons "*" and "#" disposed in a matrix pattern. An ordinary telephone does not include the alphabetical buttons "A" to "D." A circle 1203 momentarily appears when a user presses a button. According to the example illustrated in FIG. 12, the push-button pressed by a user is a numerical button "1." If a user presses a symbol button "#", a new circle 1203 appears around the symbol "#" while the circle disappears from the number "1." If a user does not press any button, the circle 1203 does not appear on the display screen 1201.

Figure 13:
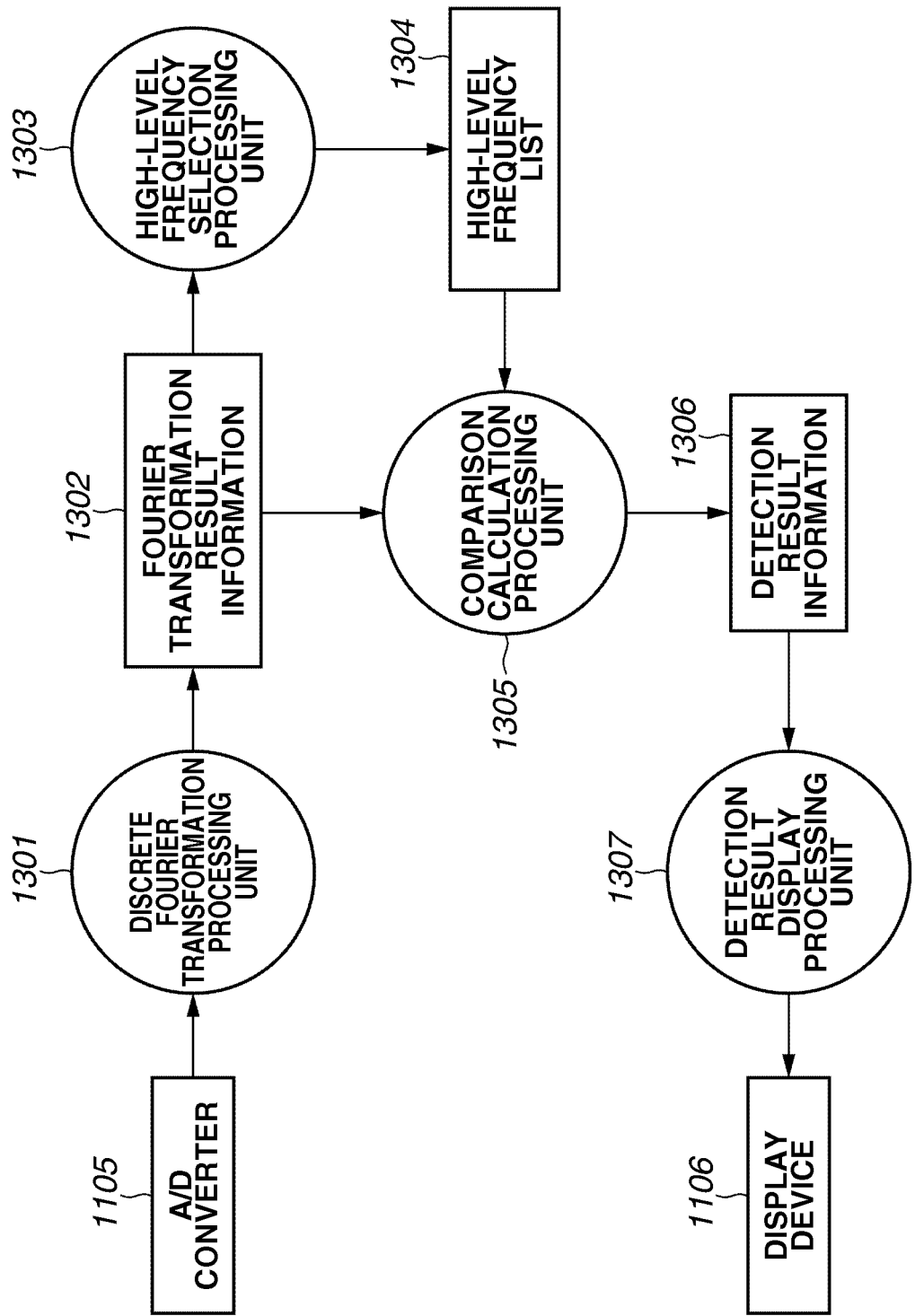
FIG. 13 is a block diagram illustrating an example functional configuration of the pattern recognition apparatus according to the second exemplary embodiment of the present invention.

FIG. 13 is a block diagram illustrating an example functional configuration of the pattern recognition apparatus according to the second exemplary embodiment of the present invention. The CPU 1101 executes a program stored in the program memory 1102 to realize functional blocks 1301, 1303, 1305, and 1307 illustrated in FIG. 13.

Figure 14:
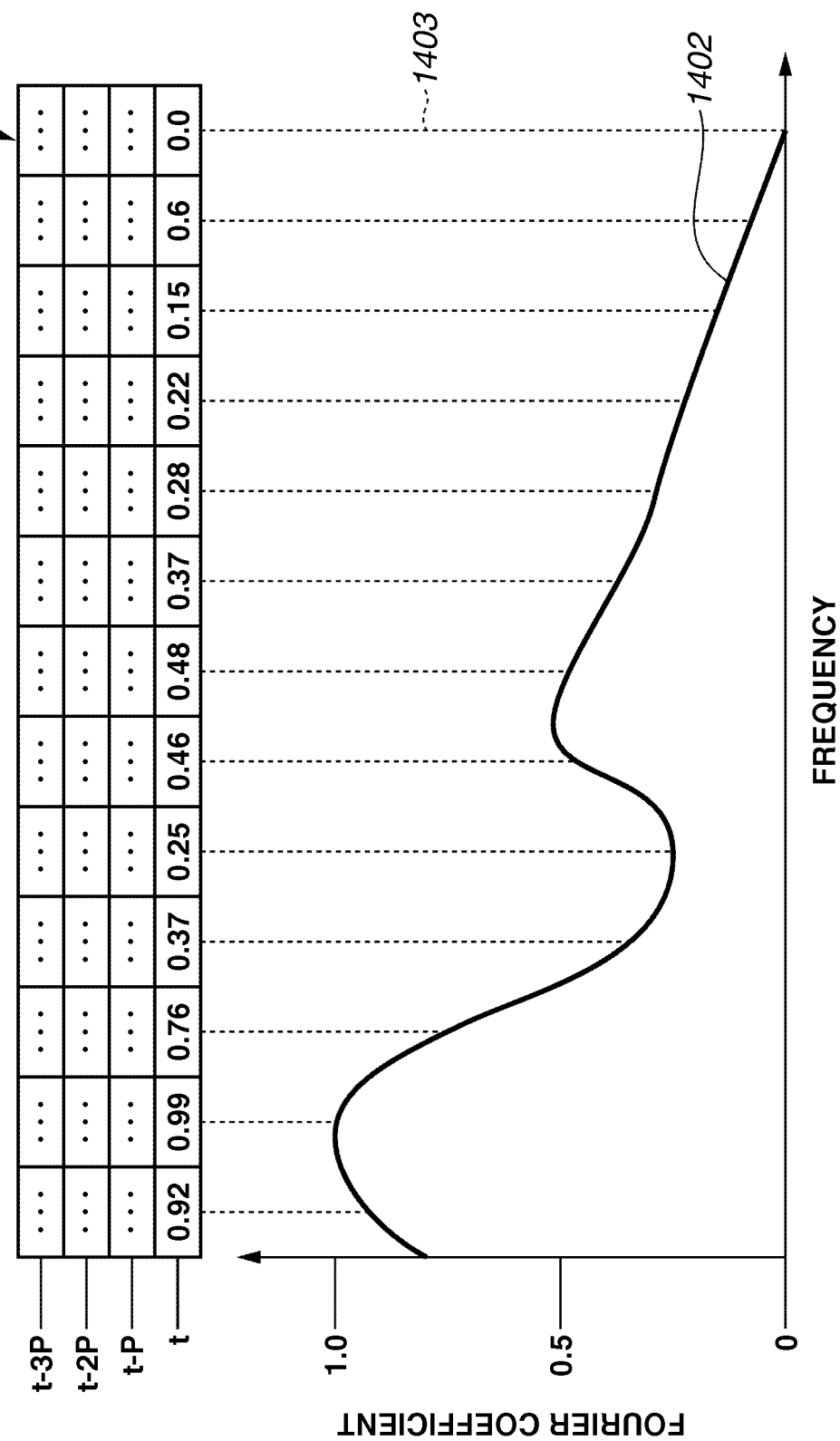
FIG. 14 illustrates an example format for Fourier transformation result information illustrated in FIG. 13.

The A/D converter 1105 illustrated in FIG. 13 is similar to the A/D converter 1105 illustrated in FIG. 11. The A/D converter 1105 is an external input unit for the CPU 1101. The discrete Fourier transformation processing unit 1301 acquires, as input information, a signal entered via a public telephone line and converted into a digital format by the A/D converter 1105. More specifically, the input information acquired in this case is a PCM signal, which can be obtained by sampling a speech signal at predetermined time intervals. The discrete Fourier transformation processing unit 1301 converts a PCM signal of past T msec obtained by the A/D converter 1105 into a frequency signal at intervals of P msec. For example, the RAM 1103 stores the converted signal as Fourier transformation result information 1302. As described below, FIG. 14 illustrates an example format for the Fourier transformation result information 1302.

Figure 15:
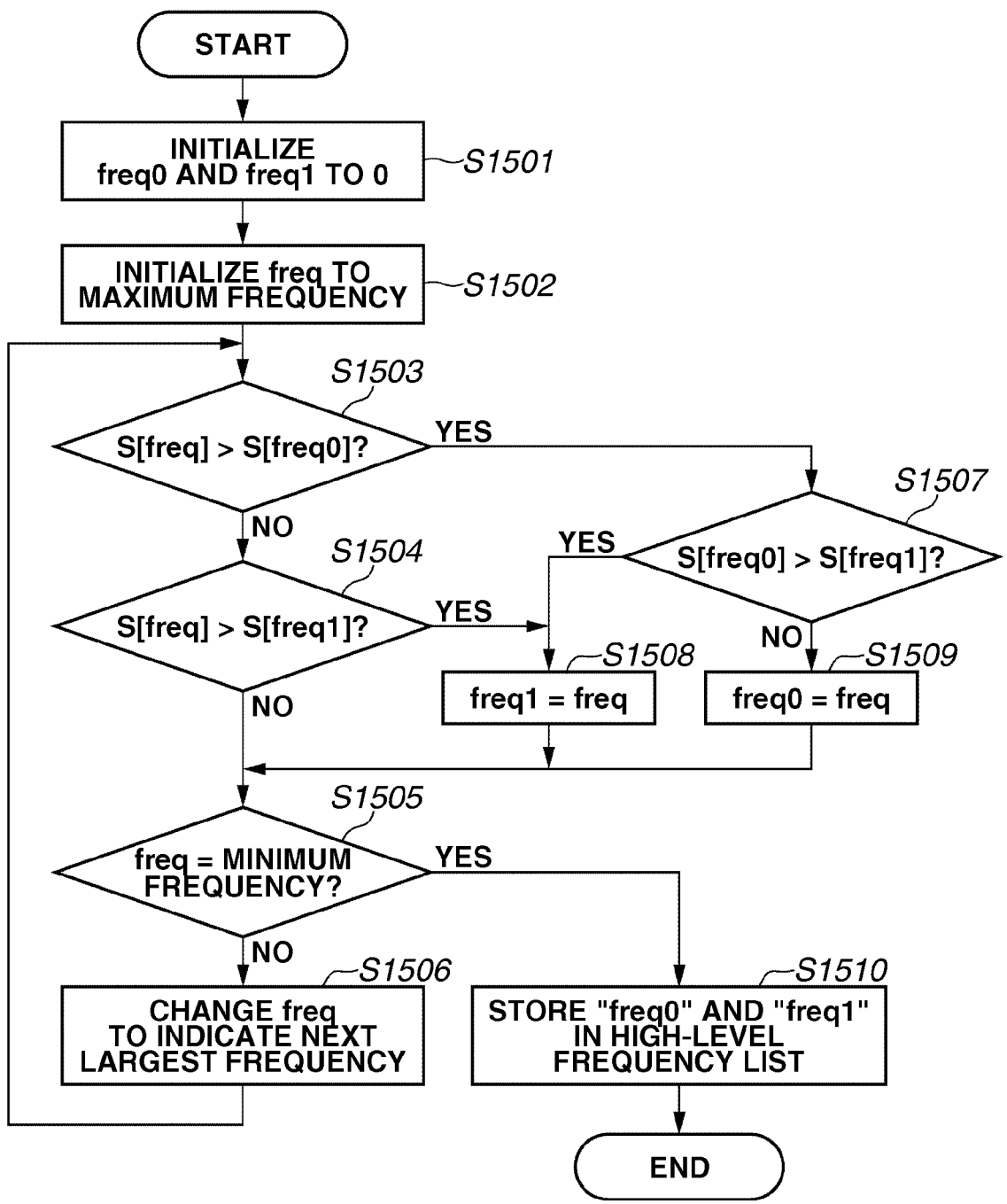
FIG. 15 is a flowchart illustrating an example detailed procedure of processing performed by a high-level frequency selection processing unit illustrated in FIG. 13.

The high-level frequency selection processing unit 1303 selects a plurality of frequencies having higher energy in the Fourier transformation result information 1302. As described below, FIG. 15 illustrates detailed processing performed by the high-level frequency selection processing unit 1303. A high-level frequency list 1304 includes frequency information selected by the high-level frequency selection processing unit 1303. For example, the RAM 1103 stores the high-level frequency list 1304.

Figure 16:
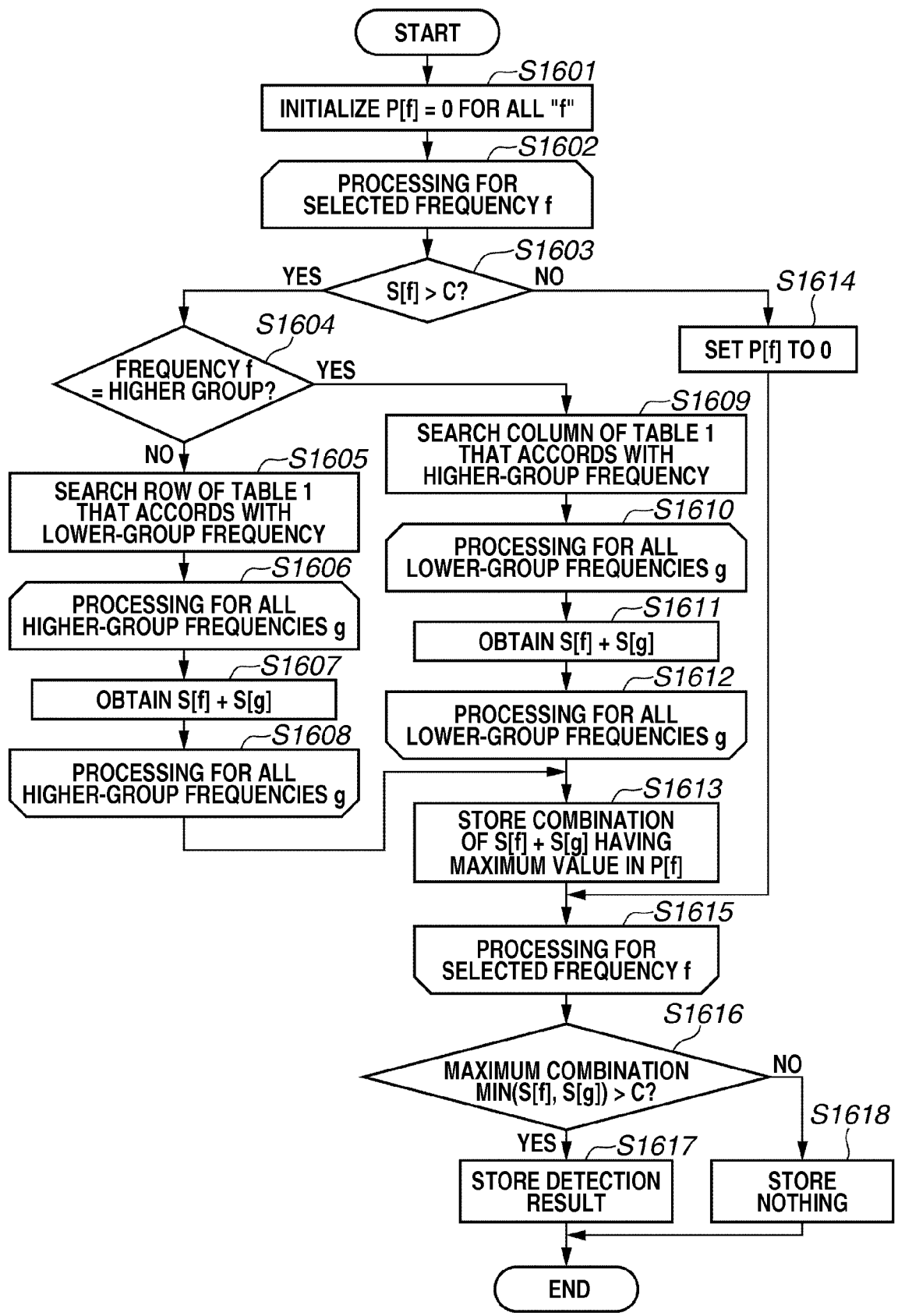
FIG. 16 is a flowchart illustrating an example detailed procedure of processing performed by a comparison calculation processing unit illustrated in FIG. 13.

The comparison calculation processing unit 1305 performs comparison calculation processing on the Fourier transformation result information 1302 and the pattern including frequencies in the high-level frequency list 1304. For example, the RAM 1103 stores the output of comparison calculation processing unit 1305 (i.e., information of a likely pattern), as detection result information 1306. As described below, FIG. 16 illustrates detailed processing performed by the comparison calculation processing unit 1305.

The detection result display processing unit 1307 causes the display device 1106 to display the content of a detected signal as illustrated in FIG. 12, based on the detection result information 1306. The display device 1106 illustrated in FIG. 13 is similar to the display device 1106 illustrated in FIG. 11.

FIG. 14 illustrates an example format for the Fourier transformation result information 1302 illustrated in FIG. 13. A table 1401 illustrated in FIG. 14 represents two-dimensional data stored in the Fourier transformation result information 1302. A curve 1402 illustrated in FIG. 14 represents the Fourier transformation result information 1302 generated by the discrete Fourier transformation processing unit 1301. The magnitude of the curve 1402 indicates Fourier coefficient values corresponding to respective frequencies. In the second exemplary embodiment, the magnitude of the Fourier coefficient is used as a certainty indicating reception of a tone signal including the corresponding frequency.

More specifically, the discrete Fourier transformation processing unit 1301 obtains a certainty (magnitude of the Fourier coefficient) that a frequency region converted from a PCM signal includes tone signals of respective classifications. Furthermore, as illustrated in FIG. 14, the discrete Fourier transformation processing unit 1301 generates a certainty distribution. The high-level frequency selection processing unit 1303 determines a threshold based on the certainty distribution and selects one or more frequency regions having a relatively high-level certainty among the certainties obtained by the discrete Fourier transformation processing unit 1301. Furthermore, the comparison calculation processing unit 1305 performs detection processing on a tone signal.

The Fourier transformation result information 1302 is information relating to a result of the discrete Fourier transformation. The number of frequencies is finite. Each dotted line 1403 in FIG. 14 indicates a mutual relationship between a frequency component and each element of the two-dimensional data 1401. More specifically, the two-dimensional data 1401 correspond to the frequency in its horizontal direction and correspond to the time (Fourier transformation timing) in its vertical direction. For example, the Fourier coefficient illustrated in FIG. 14 is 0.0 at the maximum frequency. The element of the two-dimensional data 1401 corresponding to the maximum frequency is 0.0. The Fourier coefficient illustrated in FIG. 14 is 0.92 at the minimum frequency. The element of the two-dimensional data 1401 corresponding to the minimum frequency is 0.92.

The Fourier transformation result information 1302 is the two-dimensional data 1401 illustrated in FIG. 14, which are historical data (results) of the past Fourier transformation. More specifically, a row of time "t" indicates a result of the latest Fourier transformation. A row of time "t−P" indicates a result of the second latest Fourier transformation. A row of time "t−2P" indicates a result of the third latest Fourier transformation. To save the memory (e.g., the RAM 1103), the row indicating the oldest result of the Fourier transformation disappears every time a new row is added to the table (two-dimensional information) 1401.

FIG. 15 is a flowchart illustrating example detailed procedure of processing performed by the high-level frequency selection processing unit 1303 illustrated in FIG. 13. When "I" represents the two-dimensional information 1401 illustrated in FIG. 14, I[t] (freq) indicates the magnitude of the Fourier coefficient corresponding to a frequency "freq" at the time t. I[t] (freq) is equal to or greater than 0.0. In the flowchart illustrated in FIG. 15, S[freq] represents I[t](freq)−I[t−kP](freq) and the time interval "kP" is an arbitrary value. As an exception, S[0] is regarded as −2.0 (S[0]=−2.0). The absolute value of S[0] is greater than any element of I.

In step S1501, the high-level frequency selection processing unit 1303 initializes variables freq0 and freq1, each representing the frequency, to 0. In step S1502, the high-level frequency selection processing unit 1303 initializes the subscript "freq" to the maximum frequency to start scanning the two-dimensional information I.

In step S1503, the high-level frequency selection processing unit 1303 compares S[freq] with S[freq0] and determines whether S[freq] is greater than S[freq0]. If the high-level frequency selection processing unit 1303 determines that S[freq] is not greater than S[freq0], i.e., S[freq]≤S[freq0] (NO in step S1503), the processing proceeds to step S1504. In step S1504, the high-level frequency selection processing unit 1303 compares S[freq] with S[freq1] and determines whether S[freq] is greater than S[freq1].

If the high-level frequency selection processing unit 1303 determines that S[freq] is not greater than S[freq1], i.e., S[freq]≤S[freq1] (NO in step S1504), the processing proceeds to step S1505. In step S1505, the high-level frequency selection processing unit 1303 determines whether the "freq" is the minimum frequency.

If the high-level frequency selection processing unit 1303 determines that the "freq" is not the minimum frequency (NO in step S1505), the processing proceeds to step S1506. In step S1506, the high-level frequency selection processing unit 1303 changes the subscript "freq" to indicate the next largest frequency. Then, the processing returns to step S1503. If the high-level frequency selection processing unit 1303 determines that S[freq] is greater than S[freq0] (YES in step S1503), the processing proceeds to step S1507. In step S1507, the high-level frequency selection processing unit 1303 compares S[freq0] with [freq1] and determines whether S[freq0] is greater than S[freq1].

If the high-level frequency selection processing unit 1303 determines that S[freq0] is greater than [freq1] (YES in step S1507), or if the high-level frequency selection processing unit 1303 determines that S[freq] is greater than S[freq1] (YES in step S1504), the processing proceeds to step S1508. In step S1508, the high-level frequency selection processing unit 1303 replaces the value of "freq1" with the value of "freq."

If the high-level frequency selection processing unit 1303 determines that S[freq0] is not greater than [freq1], i.e., S[freq0]≤S[freq1] (NO in step S1507), the processing proceeds to step S1509. In S1509, the high-level frequency selection processing unit 1303 replaces the value of "freq0" with the value of "freq."

After completing the processing of step S1508 or step S1509, the processing proceeds to step S1505. If the high-level frequency selection processing unit 1303 determines that the "freq" is the minimum frequency (YES in step S1505), the processing proceeds to step S1510. In step S1510, the high-level frequency selection processing unit 1303 selects "freq0" and "freq1" as high-level frequencies. For example, the RAM 1103 stores the selected frequencies in the high-level frequency list 1304 illustrated in FIG. 13.

Through the above-described processing of steps S1501 to S1510, the high-level frequency selection processing unit 1303 can select two frequencies, which are larger in the increment of output compared to the past data of the two-dimensional information I obtained kP msec before.

FIG. 16 is a flowchart illustrating an example detailed procedure of processing performed by the comparison calculation processing unit 1305 illustrated in FIG. 13.

In step S1601, the comparison calculation processing unit 1305 initializes an array P[f] to 0, i.e., P[f]=0, for all "f." The subscript of the array P[f] corresponds to each frequency in the above-described discrete Fourier transformation.

In step S1602, the comparison calculation processing unit 1305 inputs, into variable f, one of the frequencies (two frequencies according to the present exemplary embodiment) selected by the high-level frequency selection processing unit 1303 illustrated in FIG. 13. Then, the comparison calculation processing unit 1305 repeats the loop processing of steps S1602 to S1615 for all frequencies selected by the high-level frequency selection processing unit 1303 illustrated in FIG. 13.

In step S1603, the comparison calculation processing unit 1305 compares S[f] with a constant C and determines whether S[f] is greater than the constant C. If the comparison calculation processing unit 1305 determines that S[f] is greater than the constant C (YES in step S1603), the processing proceeds to step S1604. In step S1604, the comparison calculation processing unit 1305 determines whether the frequency f is a higher-group frequency.

If the comparison calculation processing unit 1305 determines that the frequency f is not a higher-group frequency, i.e., when the frequency f is a lower-group frequency (NO in step S1604), the processing proceeds to step S1605. In step S1605, the comparison calculation processing unit 1305 searches a row of the table 1 that accords with the (lower-group) frequency f. Subsequently, the comparison calculation processing unit 1305 obtains S[f]+S[g] for each higher-group frequency g in the loop processing of steps S1606 to S1608.

If the comparison calculation processing unit 1305 determines that the frequency f is a higher-group frequency (YES in step S1604), the processing proceeds to step S1609. In step S1609, the comparison calculation processing unit 1305 searches a column of the table 1 that accords with the (higher-group) frequency f. Subsequently, the comparison calculation processing unit 1305 obtains S[f]+S[g] for each lower-group frequency g in the loop processing of steps S1610 to S1612.

After completing the processing of step S1608 or step S1612, the processing proceeds to step S1613. In step S1613, the comparison calculation processing unit 1305 obtains a combination of S[f]+S[g] having a maximum value, as P[f], among the combinations obtained through the processing of steps S1606 to S1608 or steps S1610 to S1612. For example, the RAM 1103 stores the obtained P[f].

If the comparison calculation processing unit 1305 determines that S[f] is not greater than the constant C, i.e., when S[f] is equal to or greater than the constant C (NO in step S1603), the processing proceeds to step S1614. In step S1614, the comparison calculation processing unit 1305 sets P[f] to 0, which indicates no detection of the set frequency f. For example, P[f] is set to 0 when a user of a transmission terminal does not press any button. The RAM 1103 stores the value of P[f].

After completing the loop processing of steps S1602 to S1615, the processing proceeds to step S1616. In step S1616, the comparison calculation processing unit 1305 determines whether both of S[f] and S[g] of the stored P[f] (i.e., the combination of S[f]+S[g] having the maximum value) are greater than the constant C. Namely, in step S1616, the comparison calculation processing unit 1305 determines whether a smaller one of S[f] and S[g] is greater than the constant C. The combination of S[f]+S[g] having the maximum value can be obtained by scanning P[f].

If the comparison calculation processing unit 1305 determines that both of S[f] and S[g] are greater than the constant C (YES in step S1616), the processing proceeds to step S1617. In step S1617, the comparison calculation processing unit 1305 stores information relating to a button corresponding to the maximum value of S[f]+S[g], as the detection result information 1306 illustrated in FIG. 13, in the RAM 1103. Then, based on the detection result information 1306, the detection result display processing unit 1307 illustrated in FIG. 13 causes the display device 1106 to display the circle 1203 illustrated in FIG. 12.

If the comparison calculation processing unit 1305 determines that at least one of S[f] and S[g] is not greater (equal to or smaller) than the constant C (NO in step S1616), the processing proceeds to step S1618. In step S1618, the comparison calculation processing unit 1305 does not store any information as the detection result information 1306 illustrated in FIG. 13. For example, when a user does not press any button, the comparison calculation processing unit 1305 does not store any information or stores information indicating that no button is pressed.

Through the processing of steps S1601 to S1618, the comparison calculation processing unit 1305 can store a result of the comparison calculation processing performed on the Fourier transformation result information 1302, as the detection result information 1306.

As described above, according to an exemplary embodiment, the high-level frequency selection processing unit 1303 performs high-level frequency selection processing. Therefore, the exemplary embodiment does not execute the determination processing (whether a button is pressed) for all combinations of the higher-group frequency and the lower-group frequency. Accordingly, the exemplary embodiment can detect a tone signal with a small amount of processing.

The high-level frequency selection processing unit 1303 illustrated in FIG. 13 selects a plurality of frequencies. Therefore, the exemplary embodiment can detect a tone signal even in an environment including noises, for example, when a user uses a portable phone outdoors.

In an exemplary embodiment, to simplify the description, a user's telephone transmits a small number of tone signals regulated according to ITU-T Recommendation Q.24. In this case, an exemplary embodiment can enhance processing load reduction effects when transmitting many frequency signals.

The above-described exemplary embodiments can easily select a threshold for the pattern recognition performed on input information and can satisfy requirements in processing speed and recognition accuracy. The CPU executes a program stored in the program memory 102 illustrated in FIG. 1 or the program memory 1102 illustrated in FIG. 11 to realize the example configurations illustrated in FIGS. 2, 4, 7, 9, and 13 constituting the pattern recognition apparatus according to the above-described exemplary embodiments.

Furthermore, the CPU executes a program stored in the program memory 102 illustrated in FIG. 1 or the program memory 1102 illustrated in FIG. 11 to realize the example steps illustrated in FIGS. 3, 8, 10, 15, and 16 constituting the pattern recognition method for the pattern recognition apparatus according to the above-described exemplary embodiments. The present invention encompasses the program and a computer-readable recording medium storing the program.

Furthermore, software program code for realizing the functions of the above-described exemplary embodiments is installable to a system or an apparatus including various devices. A computer (or CPU or micro-processing unit (MPU)) in the system or the apparatus can execute the program to operate the devices to realize the functions of the above-described exemplary embodiments. Accordingly, the present invention encompasses the program code installable on a computer when the computer can realize the functions or processes of the exemplary embodiments.

In this case, the program code itself can realize the functions of the exemplary embodiments. The equivalents of programs are usable if they possess comparable functions. Furthermore, the present invention encompasses supplying program code to a computer with a storage (or recording) medium storing the program code. In this case, the type of program can be any one of object code, interpreter program, and OS script data. A storage medium supplying the program can be selected from any one of a floppy disk, a hard disk, an optical disk, a magneto-optical (MO) disk, a compact disk-ROM (CD-ROM), a CD-recordable (CD-R), a CD-rewritable (CD-RW), a magnetic tape, a nonvolatile memory card, a ROM, and a DVD (DVD-ROM, DVD-R).

A computer network using a carrier wave carrying program information, such as a local area network (LAN), a wide area network (WAN) represented by the internet, or a wireless communication network is usable to transmit the program. The communication medium includes both a wired line (e.g., an optical fiber) and a wireless line.

Moreover, an operating system (OS) or other application software running on a computer can execute part or all of actual processing based on instructions of the programs. Additionally, the program code read out of a storage medium can be written into a memory of a function expansion board equipped in a computer or into a memory of a function expansion unit connected to the computer. In this case, based on an instruction of the program, a CPU provided on the function expansion board or the function expansion unit can execute part or all of the processing to realize the functions of the above-described exemplary embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-259059 filed Oct. 2, 2007, which is hereby incorporated by reference herein in its entirety.

What is claimed is:

1. A pattern recognition method applicable to a single image file including a plurality of regions, the method comprising:
obtaining certainties in which each region of the single image file includes a respective one of a plural of human face patterns by a first face detector;
determining a certainty distribution of the certainties obtained by the first face detector;

determining dynamically a threshold certainty based on the determined certainty distribution;

selecting at least one combination of the region and the human face pattern, the selected combination corresponding to the certainties which are equal to or greater than the determined threshold certainty; and detecting at least one human face image based on the selected combination by a second face detector.

2. The method according to claim 1, further comprising obtaining certainties by converting the single image file using n types of methods.

3. The method according to claim 1, wherein the single image file is image data, and wherein the method further comprises obtaining certainties by designating a first image pattern as belonging to the first classification and an n-th image pattern as belonging to the n-th classification.

4. The method according to claim 3, further comprising obtaining certainties by designating a first inclination image pattern as the first image pattern and an n-th inclination image pattern as the n-th image pattern.

5. A non-transitory computer-readable storage medium storing a program for causing a computer to perform the method as claimed in claim 1.

6. A pattern recognition method according to claim 1, wherein the single image file is an image file.

7. A pattern recognition method according to claim 1, wherein the first detector obtains a certainty of each classification in each region, and each classification is an affine transformation.

8. A pattern recognition method according to claim 7, wherein each classification of which the certainty is obtained by the first detector, corresponds to an orientation of one of the patterns with a first order of precision;

the pattern detection processing by the second detector obtains the orientation of one of the patterns with a second order of precision; and the second order of precision is more precise than the first order of precision.

9. A pattern recognition method according to claim 7, wherein each classification of which the certainty is obtained by the first detector, corresponds to a parameter of one of the patterns with a first order of precision;

the pattern detection processing by the second detector obtains the parameter of one of the patterns with a second order of precision; and the second order of precision is more precise than the first order of precision.

10. A pattern recognition method according to claim 1, wherein the first detector obtains the certainties using a ratio of pixels having a predetermined color in the each region of the single image file.

11. A pattern recognition method according to claim 1, wherein the second face detector performs a detection which is different from the first face detector, at least with respect to accuracy.

12. A non-transitory computer-readable storage medium that stores a program for causing a computer to execute the method according to claim 1.

13. A pattern recognition apparatus configured to identify a pattern in a single image file including a plurality of regions, the apparatus comprising:

a first detection unit configured to obtain certainties in which each region of the single image file includes a respective one of a plural of human face patterns of first to n-th, where n is a natural number equal to or greater than 2, classifications by a first detector;

a determination unit configured to determine a certainty distribution of the certainties obtained by the first detector;

a second determination unit configured to dynamically determine a threshold certainty based on the determined certainty distribution;

a selection unit configured to select at least one combination of the region and the human face pattern, the selected combination corresponding to the certainties which are equal to or greater than the determined threshold certainty; and a second detection unit configured to detecting at least one human face image based on the one or more combinations selected by the selection unit.

14. A method comprising:

obtaining certainties in which each region of an image file includes at least one pattern by a first detector;

determining a certainty distribution of the certainties obtained by the first detector;

determining dynamically a threshold certainty based on the determined certainty distribution;

selecting at least one region from the plurality of the regions, the selected region corresponding to the certainty which is equal to or greater than the determined threshold certainty; and detecting at least one pattern based on the selected region by a second detector.

15. A non-transitory computer-readable storage medium that stores a program for causing a computer to execute the method according to claim 14.

16. A method comprising:

obtaining certainties in which each region of an image file includes a respective one of patterns of first to n-th, where n is a natural number equal to or greater than 2, classifications by a first detector;

determining a certainty distribution of the certainties obtained by the first detector;

determining dynamically a threshold certainty based on the determined certainty distribution;

selecting at least one classification from the plurality of classifications, the selected classification corresponds to the certainty which is equal to or greater than the determined threshold certainty; and detecting at least one pattern based on the selected classification by a second detector.

17. A non-transitory computer-readable storage medium that stores a program for causing a computer to execute the method according to claim 16.

18. An apparatus comprising:

an obtaining unit configured to obtain certainties in which each region of an image file includes at least one pattern by a first detector;

a first determining unit configured to determine a certainty distribution of the certainties obtained by the first detector;

a second determining unit configured to determine dynamically a threshold certainty based on the determined certainty distribution;

a selecting unit configured to select at least one region from the plurality of the regions, the selected region corresponding to the certainty which is equal to or greater than the determined threshold certainty; and a detecting unit configured to detect at least one pattern based on the selected region by a second detector.

19. An apparatus comprising:
- an obtaining unit configured to obtain certainties in which each region of an image file includes a respective one of patterns of first to n-th, where n is a natural number equal to or greater than 2, classifications by a first face detector;
- a first determining unit configured to determine a certainty distribution of the certainties obtained by the first detector;
- a second determining unit configured to determine dynamically a threshold certainty based on the determined certainty distribution;
- a selecting unit configured to select at least one classification from the plurality of classifications, the selected classification corresponding to the certainty which is equal to or greater than the determined threshold certainty; and
- a detecting unit configured to detect at least one pattern based on the selected classification by a second detector.

* * * * *